(12) United States Patent
Fujimori et al.

(10) Patent No.: US 7,114,816 B2
(45) Date of Patent: Oct. 3, 2006

(54) FIXING PLATE, OPTICAL DEVICE AND PROJECTOR

(75) Inventors: Motoyuki Fujimori, Suwa (JP); Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 210 days.

(21) Appl. No.: 10/855,323

(22) Filed: May 28, 2004

(65) Prior Publication Data

US 2005/0012910 A1    Jan. 20, 2005

(30) Foreign Application Priority Data

May 28, 2003    (JP)    ............... 2003-150736

(51) Int. Cl.
| | | |
|---|---|---|
| G03B 21/14 | (2006.01) | |
| G03B 21/26 | (2006.01) | |
| G03B 21/28 | (2006.01) | |
| G02F 1/00  | (2006.01) | |
| G02F 1/1333 | (2006.01) | |
| G02F 1/1335 | (2006.01) | |
| H04N 5/74  | (2006.01) | |

(52) U.S. Cl. .......... 353/119; 353/31; 353/33; 353/34; 353/81; 353/82; 348/750; 348/757; 348/758; 348/759; 349/8; 349/58; 359/242; 359/638; 359/640

(58) Field of Classification Search ............ 353/119, 353/122, 30, 31, 33, 34, 81, 82; 348/739, 348/744, 750, 751, 758, 759, 771, 757; 349/7, 349/8, 58; 359/242, 244, 618, 629, 634, 359/638–640
See application file for complete search history.

(56) References Cited

U.S. PATENT DOCUMENTS 6,406,151 B1 * 6/2002 Fujimori ............... 353/119
6,935,745 B1   8/2005 Kitabayashi et al. ..... 353/20

FOREIGN PATENT DOCUMENTS

| JP | A 2000-010186  | 1/2000 |
|----|---------------|--------|
| JP | A 2000-259094  | 9/2000 |
| KR | A 2003-0014624 | 2/2003 |

* cited by examiner

Primary Examiner—W. B. Perkey
Assistant Examiner—Rochelle Blackman
(74) Attorney, Agent, or Firm—Oliff & Berridge, PLC

(57) ABSTRACT

The invention provides a fixing plate, optical device and projector capable of preventing against color unevenness occurrence and pixel deviation. Specifically, in each of the four sides of a luminous-flux exit surface of a plate part of a fixing plate, there can alternately be formed a first cutout in a groove form extending from an opening toward an outer edge of the plate part and nearly orthogonal to a lengthwise of each side, and a second cutout in a groove form extending from the outer edge toward the opening and nearly orthogonal to the lengthwise of each side.

7 Claims, 17 Drawing Sheets

FIXING PLATE, OPTICAL DEVICE AND PROJECTOR

BACKGROUND OF THE INVENTION

1. Field of Invention

The present invention relates to a fixing plate, optical device and projector.

2. Description of Related Art

Conventionally, there is known so-called a three-plate type projector which is provided with a light source, a color-separating optical system for separating the luminous flux emitted from the light source into three colors of light of R, G and B by use of a dichroic mirror, three light modulator devices for modulating the separated luminous fluxes based on each color of light in accordance with image information, and a color synthesizer device for synthesizing the luminous fluxes modulated by the color modulator devices.

Such a projector light modulator device has a light modulator element filled with a light modulator element proper between a pair of substrates, and a holder frame holding the light modulator element. The holder frame of the light modulator device is attached on the fixing plate. By fixing the fixing plate onto a luminous-flux incident end face of a color-synthesizing optical device, the light modulator device and the color-synthesizing optical device are integrated together. See, for example, Publication of JP-A-2000-259094 (page 6, FIG. 5).

SUMMARY OF THE INVENTION

In such a projector, in the case there is a difference between the expansion coefficient of the holder frame of the light modulator device and the expansion coefficient of the fixing plate, the holder frame is applied by a deformation force of expansion/contraction ratio of the fixing plate. This deforms the gap between the substrates in pair of the light modulator device to thereby change the transmittance of transmission luminous flux, possibly causing color unevenness in the projection image.

Meanwhile, usually, the fixing plate fixing the light modulator device is made of metal whereas the color-synthesizing optical device on which the fixing plate is to be bonded is made of glass. Thus, the expansion coefficients are greatly different. The fixing plate is to be deformed by a force caused by the difference of expansion/contraction ratio, to possibly deviate the fixing plate relative in position to the color-synthesizing optical device. The fixing plate if deviated in position relative to the color-synthesizing optical device results in a positional deviation of the color-synthesizing optical device fixed on the fixing plate, possibly causing a pixel deviation in the projection image.

It is an object of the present invention to provide a fixing plate, optical device and projector capable of preventing against color unevenness occurrence and pixel deviation.

A fixing plate of the invention is a fixing plate attached at a luminous-flux exit side of a light modulator device for modulating a luminous flux emitted from a light source in accordance with image information and forming an optical image, and for fixing the light modulator device on a color-synthesizing optical device for synthesizing colors of light exited from the light modulator device. The fixing plate can include a plate part in a rectangular plate form fixing the light modulator device and formed with an opening for transmitting a luminous flux exited from the light modulator device. In four sides of a luminous-flux incident surface or luminous-flux exit surface of the plate part, a groove-formed cutout is formed extending nearly orthogonal to a lengthwise of each side.

According to the invention like this, a cutout in a groove form is formed extending nearly orthogonal to a lengthwise of each side, in four sides of the luminous-flux incident surface or luminous-flux exit surface of the plate part of the fixing plate, hence making it possible to suppress the plate part of the fixing plate from expanding/contracting. This can prevent the light modulator device from being applied by a deformation force of expansion/contraction of the fixing plate, making it possible to prevent a transmittance change of transmitting luminous flux through the light modulator device and further an occurrence of color unevenness.

Meanwhile, because the fixing plate can be suppressed from expanding/contracting, the expansion/contraction ratio of the fixing plate can be approximated to the expansion/contraction ratio of the color-synthesizing optical device, making it possible to decrease the force caused by a difference in expansion/contraction ratio. Consequently, it is possible to prevent the fixing plate from deviating in position relative to the color-synthesizing optical device, and further the light modulator device fixed on the fixing plate from deviating in position. In this manner, because the light modulator device can be prevented from deviating in position, pixel deviation can be prevented in the projection image.

In the invention, preferably the cutout has a first cutout part extending from the opening toward an outer edge and a second cutout part extending from the outer edge toward the opening, the first cutout part and the second cutout part being alternately formed in each side. According to the invention, because there are alternately formed, in each side, the first cutout part extending from the opening toward an outer edge and the second cutout part extending from the outer edge toward the opening, a warp can be prevented from occurring upon expansion/contraction of the fixing plate.

Furthermore, in the invention, preferably the number of the cutouts is the value resulting when an expansion coefficient of the fixing plate is divided by an expansion coefficient of the color-synthesizing optical device and then is changed into an integer, or the above value changed into an integer is multiplied by an integer. By providing the number mentioned above as the number of cutouts, it is possible to decrease the difference between the expansion/contraction ratio of the fixing plate and the expansion/contraction ratio of the color-synthesizing optical device. This makes it possible to prevent a positional deviation of the fixing plate relative to the color-synthesizing optical device and further a positional deviation of the light modulator device fixed on the fixing plate. In this manner, because the light modulator device can be prevented from deviating in position, pixel deviation can be also prevented in the projection image.

Furthermore, in the invention, preferably the expansion coefficient is $7.0 \times 10^{-6}$ or greater and $26 \times 10^{-6}$ or smaller. Particularly, it is preferably a value nearly intermediate between the expansion coefficient of the holder frame of light modulator device fixed on the fixing plate and the expansion coefficient of the color-synthesizing optical device.

In this manner, by taking the value nearly intermediate between the expansion coefficient of the holder frame and the expansion coefficient of the color-synthesizing optical device, the difference can be reduced between the expansion coefficient of the holder frame and the expansion coefficient of the color-synthesizing optical device.

Namely, because of the reduced difference between the expansion coefficient of the holder frame and the expansion coefficient of the color-synthesizing optical device, the holder frame can be prevented from being applied by a force caused by expansion/contraction of the fixing frame. This makes it possible to prevent against a transmittance change of transmitting luminous flux through the light modulator device and further an occurrence of color variation.

Meanwhile, because of the reduced difference between the expansion coefficient of the fixing plate and the expansion coefficient of the color-synthesizing optical device, it is possible to reduce the force occurring due to the difference in expansion/contraction ratio between those. This can prevent a positional deviation of the fixing plate relative to the color-synthesizing optical device, and further can positively prevent a pixel deviation occurring due to such a positional deviation.

An optical device of the invention is an optical device having a light modulator device for modulating a luminous flux emitted from a light source in accordance with image information and forming an optical image, and a color-synthesizing optical device for synthesizing colors of light modulated by the light modulator device. The optical device can include a fixing plate for fixing the light modulator device at a luminous-flux incident end face of a color-synthesizing optical device, the fixing plate being a fixing plate according to any of the foregoing fixing plates. According to the invention like this, because of the provision of any of the foregoing fixing plates, there is exhibited an effect capable of preventing against color unevenness occurrence and pixel deviation occurrence.

Furthermore, a projector of the invention can include an optical device mentioned above and a projection optical system for projecting an image formed by the optical device. According to the invention like this, because of the provision of the foregoing optical device, there is exhibited an effect similar to the optical device.

BRIEF DESCRIPTION OF THE DRAWINGS

The invention will be described with reference to the accompanying drawings, wherein like numerals reference like elements, and wherein.

Figure 14:
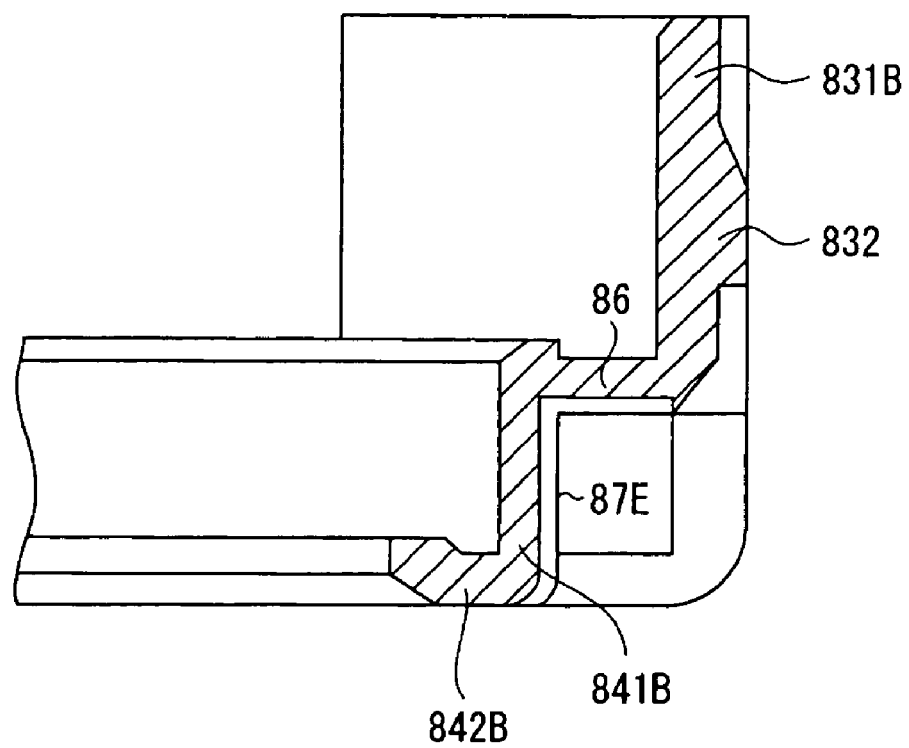
Figure 15:
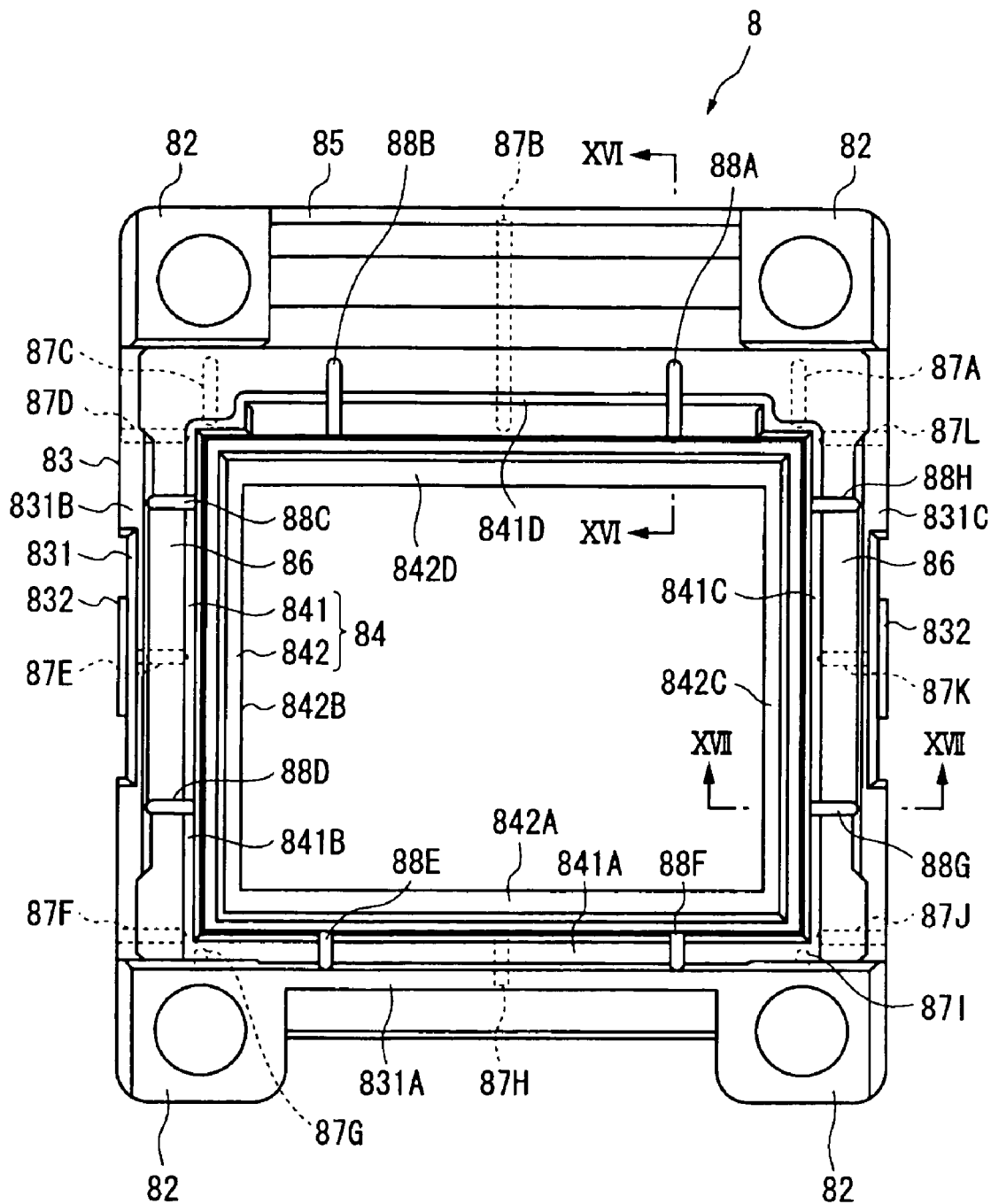
Figure 16:
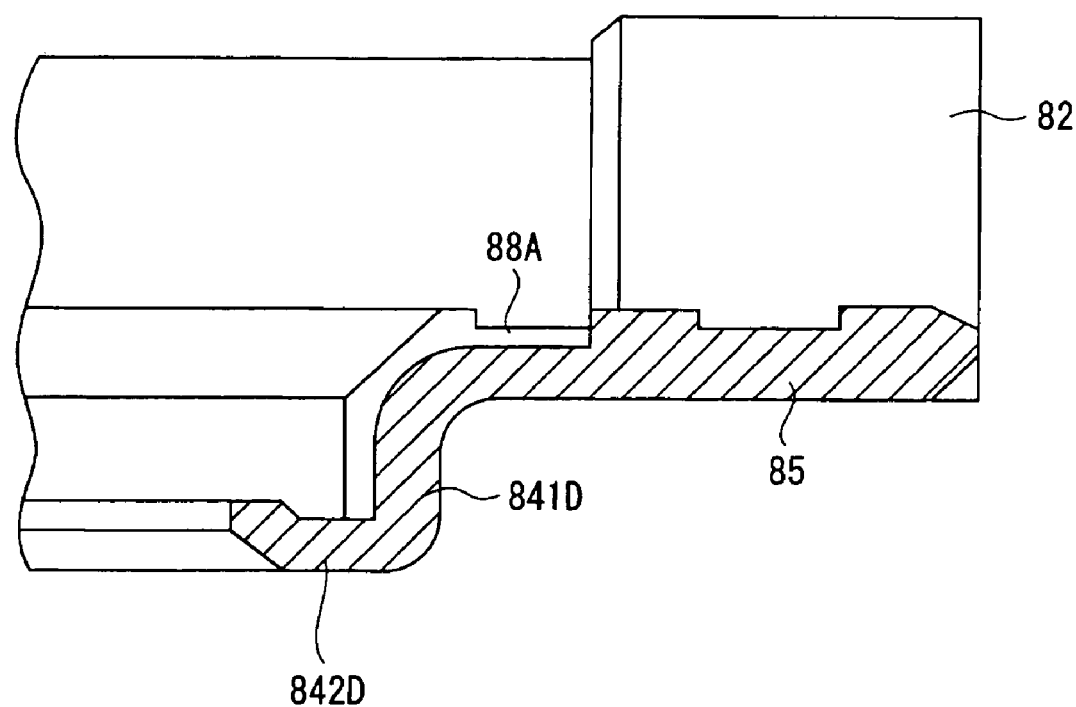

FIG. is 13 a sectional view showing an essential part of the holder frame;

FIG. 14 is a sectional view showing an essential part of the holder frame;

FIG. 15 is a plan view of the holder frame;

FIG. 16 is a sectional view showing an essential part of the holder frame; and

Figure 17:
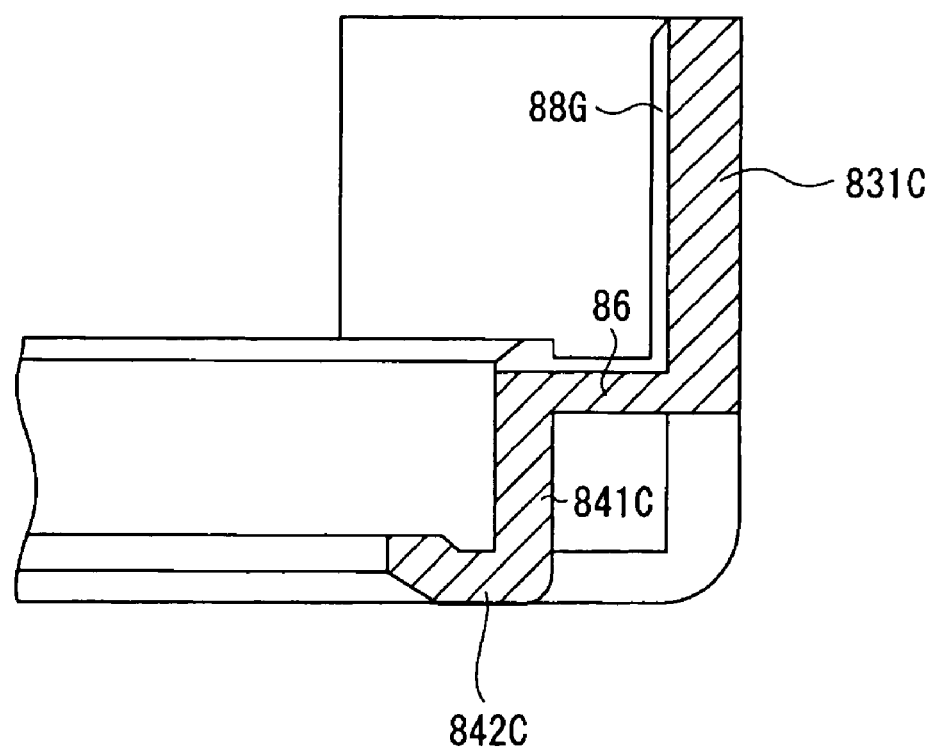

FIG. 17 is a sectional view showing an essential part of the holder frame.

DETAILED DESCRIPTION OF PREFERRED EMBODIMENTS

Hereunder, an embodiment of the invention is explained based on the drawings.

Figure 1:
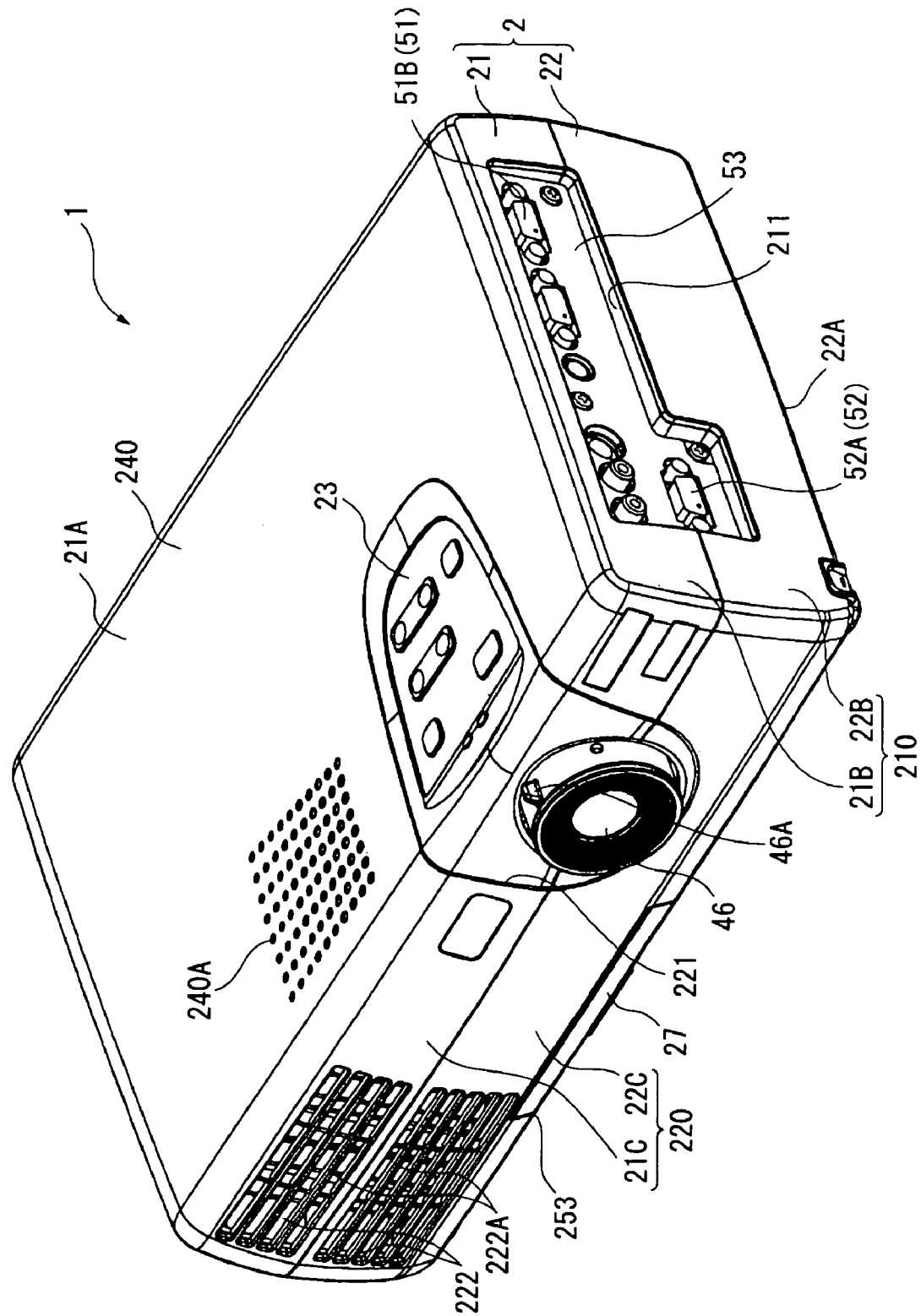
FIG. 1 is a perspective view of a projector in the this embodiment of the present invention as viewed from the upper front.
Figure 2:
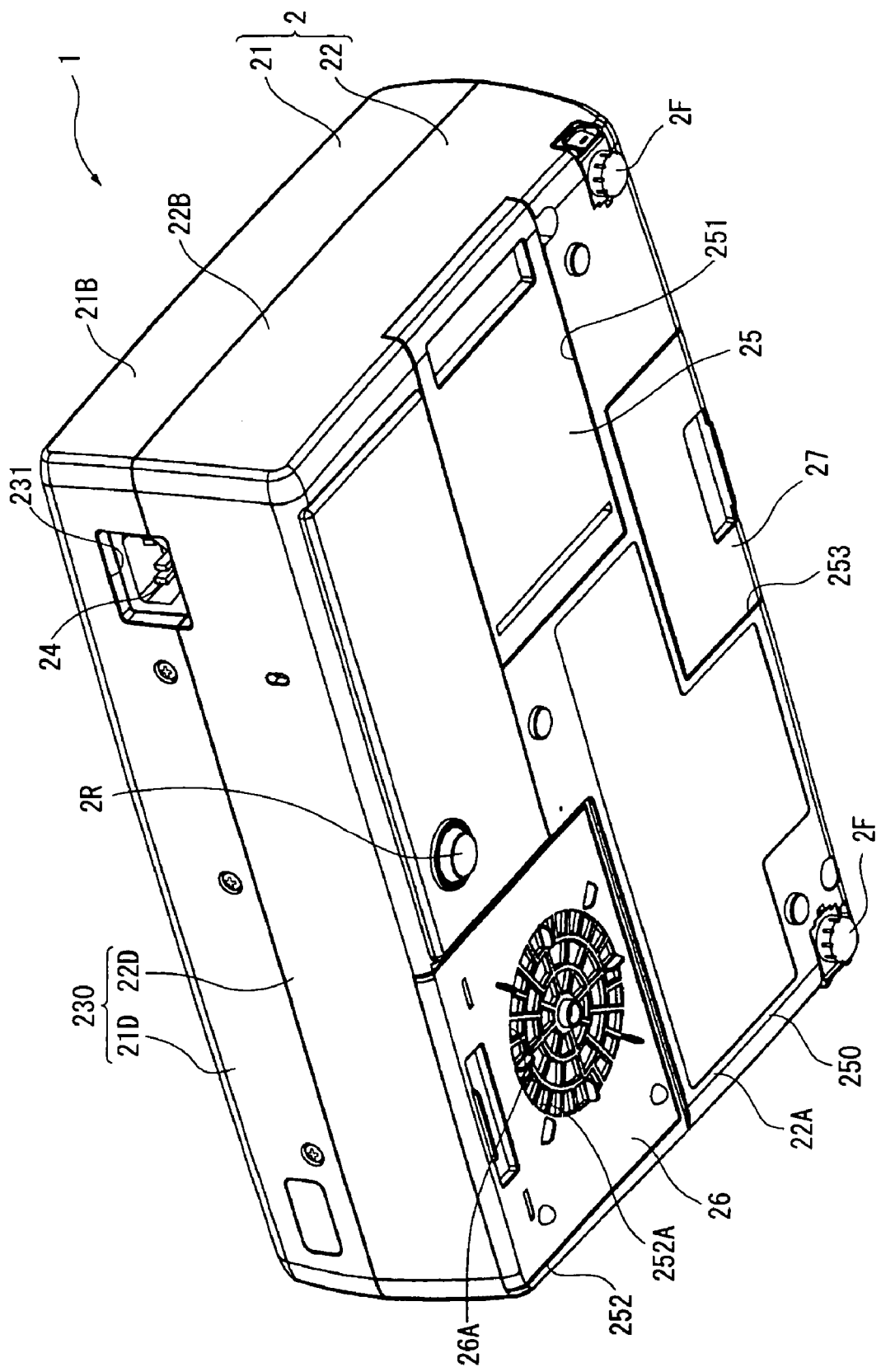
FIG. 2 is a perspective view of the projector as viewed from the lower back.

FIG. 1 is a perspective view of a projector 1 according to the invention as viewed from the upper front. FIG. 2 is a perspective view of the projector 1 as viewed from the lower back.

As shown in FIGS. 1 and 2, the projector 1 has an exterior case 2 nearly in a cubic form formed by injection molding. The exterior case 2 is a synthetic resin housing accommodating the main body of the projector 1, with an upper case 21 and a lower case 22. These cases 21, 22 are constructed removable from each other.

The upper case 21 is structurally includes an upper surface 21A, a side surface 21B, a front surface 21C and a back surface 21D respectively configuring an upper surface, a side surface, a front surface and back surface of the projector 1, as shown in FIGS. 1 and 2.

Likewise, the lower case 22 also structurally includes a lower surface 22A, a side surface 22B, a front surface 22C and back surface 22D respectively configuring a lower surface, a side surface, a front surface and a back surface of the projector 1, as shown in FIGS. 1 and 2.

Consequently, in the cubic exterior case 2, a cubic side part 210 is configured by connecting between the side surfaces 21B, 22B of the upper case 21 and lower case 22 in a continuous fashion, as shown in FIGS. 1 and 2. Similarly, a front part 220 is configured by connecting between the front surfaces 21C, 22C, a back part 230 by connecting between the back surfaces 21D, 22D, an upper part 240 by the upper surface 21A, and a lower part 250 by the lower surface 22A, respectively.

As shown in FIG. 1, in the upper surface part 240, an operation panel 23 is provided at the front thereof. A speaker hole 240A for outputting sound is formed in the vicinity of the operation panel 23.

In the side part 210 on the right as viewed from the front, there is formed an aperture 211 bestriding the two side surfaces 21B, 22B. Here, a main board 51 and an interface board 52, referred later, are provided within the exterior case 2. Through an interface panel 53 attached on the aperture 211, exposed outside are a connection 51B mounted on the main board 51 and a connection 52A mounted on the interfaced board 52. In these connections 51B, 52A, the projector 1 is connected with external electronic appliances, etc.

In the front part 220, a circular aperture 221 bestriding both the two front surfaces 21C, 22C is formed on the right as viewed from the front and in the vicinity of the operation panel 23.

In a manner corresponding to the aperture 221, a projection lens 46 is arranged within the exterior case 2. On this occasion, the projection lens 46 at its tip is exposed outside out of the aperture 221. Through a lever 46A as a part of the exposed part, the projection lens 46 can be focus-operated manually.

In the front part 220, an air exit port 222 is formed in a position opposite to the aperture 221. The air exit port 222 is formed with a safety cover 222A.

As shown in FIG. 2, in the back part 230, a rectangular aperture 231 is formed at the right as viewed from the back surface so that an inlet connector 24 is exposed out of the aperture 231.

In the lower part 250, a rectangular aperture 251 is formed in a center at a right end as viewed from the below. On the aperture 251, a lamp cover 25 is removably provided covering the aperture 251. By removing the cover 25, a light source lamp, not shown, can be exchanged easily.

Meanwhile, in the lower part 250, a rectangular surface 252 recessed one step inward is formed at the left as viewed from the below and in the corner close to the back surface. In the rectangular surface 252, an air intake port 252A is formed to intake cooling air from the outside. The rectangular surface 252 is removably provided with an air intake cover 26 covering the rectangular surface 252. The air intake cover 26 is formed with an aperture 26A corresponding to the air intake port 252A. On the aperture 26A, an air filter, not shown, is provided to prevent dust from intruding into the interior.

Furthermore, in the lower part 250, a rear leg 2R structuring a leg of the projector 1 is formed nearly in a rear center. Meanwhile, front legs 2F similarly configuring the legs of the projector 1 are respectively formed in the front left and right corners in the lower surface 22A. Namely, the projector 1 is supported at three points by the rear leg 2R and the two front legs 2F.

The two legs 2F are each structured to advance and retract vertically so that they can adjust the inclination (position) of the projector 1 in directions of front, back and left and right, thereby enabling positional adjustment for a projection image.

Meanwhile, as shown in FIGS. 1 and 2, a recess 253 in a cubic form is formed nearly in the front center in the exterior case 2, in a manner bestriding the lower part 250 and the front part 220. The recess 253 is provided with a cover member 27 slidable back and forth and covering the lower and front region of the recess 253. By the cover member 27, the recess 253 accommodates therein a remote controller (remocon), not shown, for remotely operating the projector 1.

Figure 3:
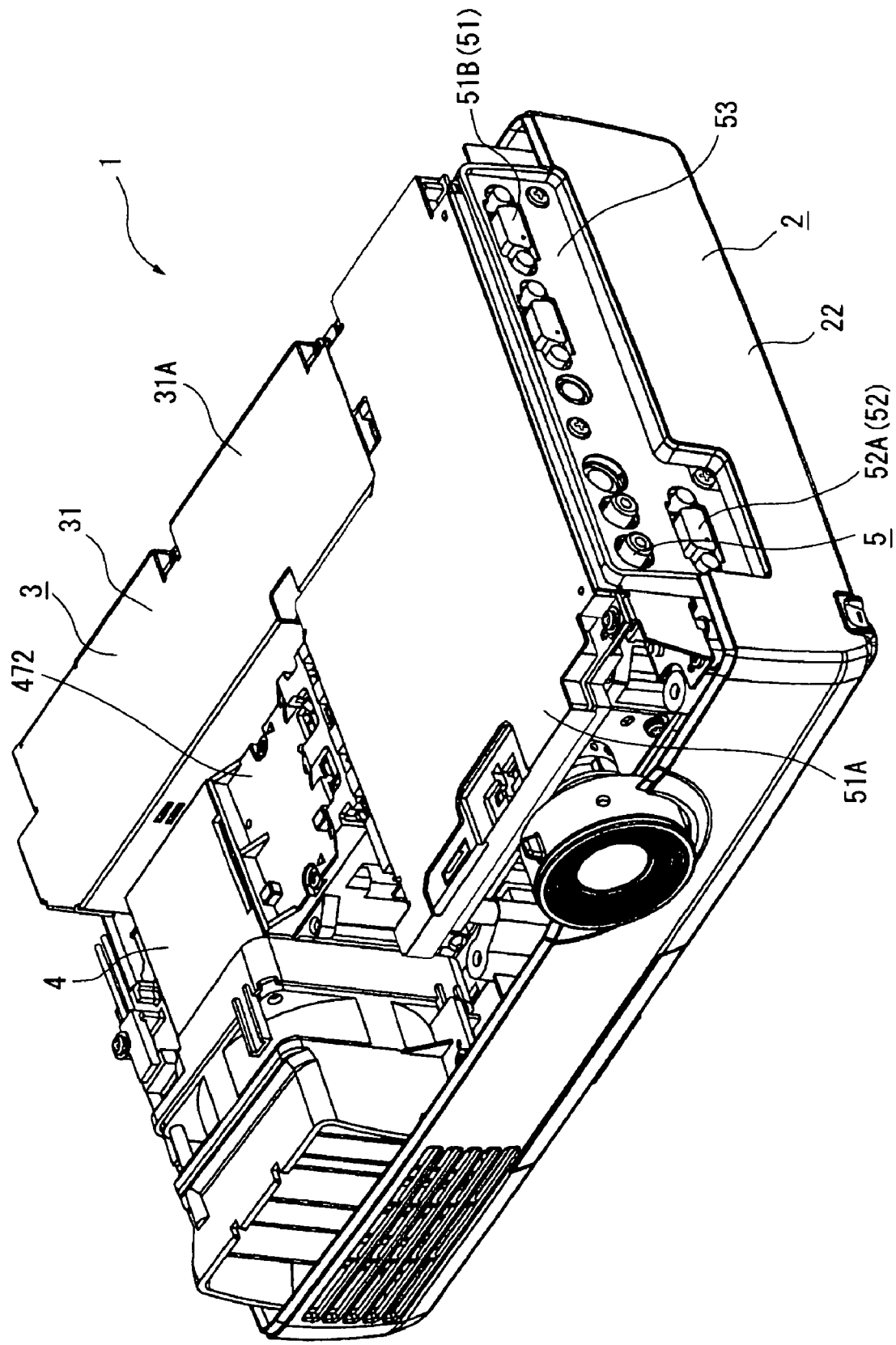
FIG. 3 is a perspective view showing an interior of the projector.
Figure 4:
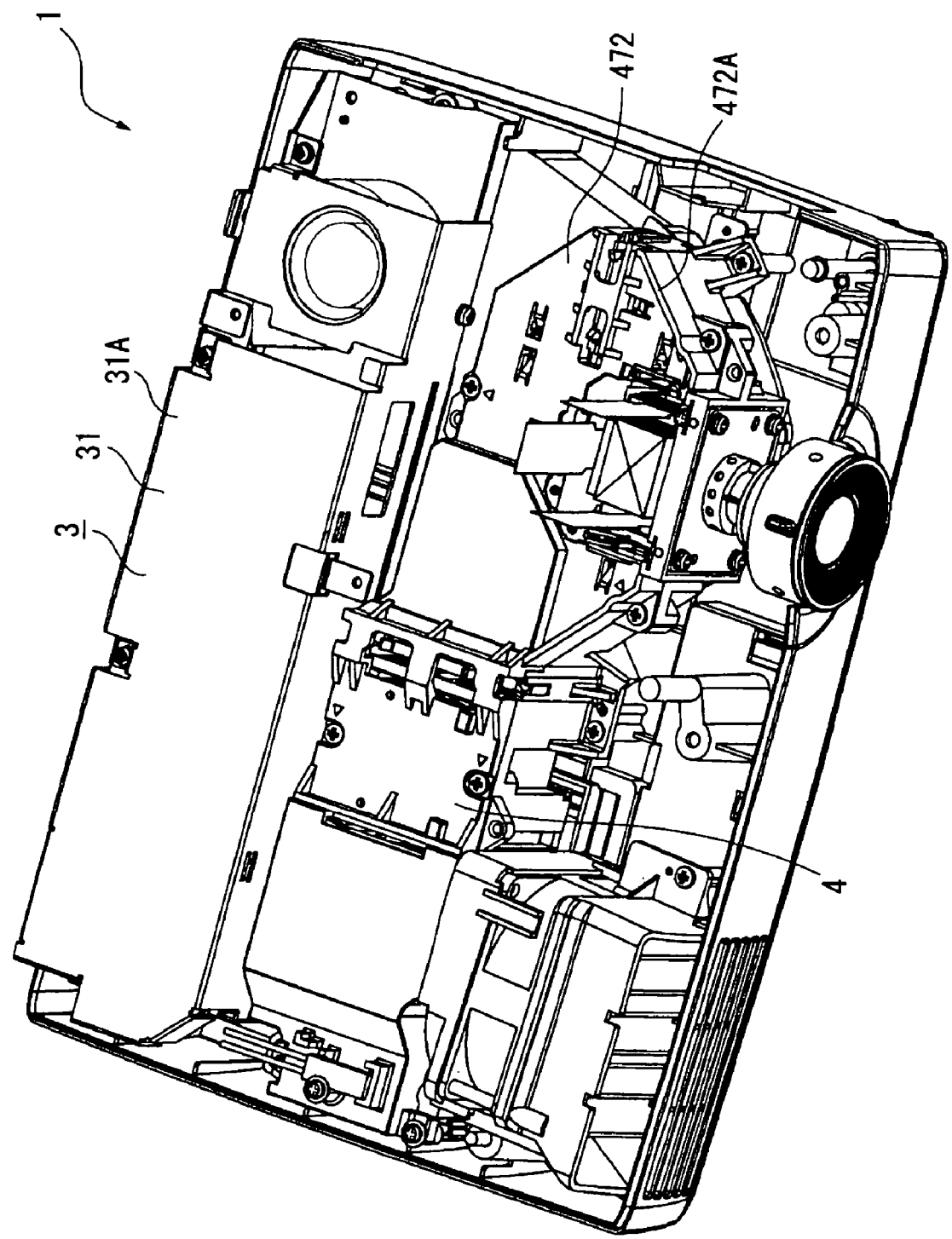
FIG. 4 is a perspective view showing an interior of the projector.

Here, FIGS. 3 and 4 are perspective views showing the interior of the projector 1. Specifically, FIG. 3 is a view that the upper case 21 of the projector 1 is removed from the state of FIG. 1. FIG. 4 is a view that the control board 5 is removed from the state of FIG. 3.

The exterior case 2, as shown in FIGS. 3, 4, is provided with a power supply unit 3 arranged along the back part and extending in left and right directions, an optical unit 4 as an optical system arranged in front of the power supply unit 3 and nearly in an L-form as viewed in plan, and a control board 5 as a control part arranged in the above and on the right side of these units 3, 4. These devices 3–5 constitute the main body of the projector 1.

The power supply unit 3 structurally includes a power supply 31, and a lamp drive circuit (ballast), not shown, arranged beneath the power supply 31. The power supply 31 feeds the power externally supplied through a power cable, not shown, connected to the inlet connector to the lamp drive circuit, the control board 5 and so on.

The lamp drive circuit feeds the power supplied from the power supply 31 to a light source lamp, not shown in FIGS. 3 and 4, constituting the optical unit 4, which is electrically connected to the light source lamp. The lamp drive circuit like this can be configured by making a wiring on a board, for example.

The power supply 31 and the lamp drive circuit are arranged upper and lower nearly parallel, the occupation space of which extends in the left and right directions at the rear of the projector 1.

Meanwhile, the power supply 31 and the lamp drive circuit are covered over by a metal shield member 31A, such as of aluminum, opened at left and light sides.

The shield member 31A has a function to prevent the electromagnetic noise caused on the power supply 31 and lamp drive circuit from leaking to the outside, in addition to a function as a duct to induce cooling air.

The control board 5 has, as shown in FIG. 3, a main board 51 arranged covering over the units 3, 4 and including a CPU, a connection 51B, etc. and an interface board 52 arranged underneath the main board 51 and including a connection 52A.

In the control board 5, the CPU, etc. of the main board 51 control a liquid-crystal panel constituting an optical device, referred later, according to the image information inputted through the connections 51B, 52A.

The main board 51 is covered over by a metal shield member 51a. The main board 51 is in abutment against an upper end 472A (FIG. 4) of an upper light guide 472 constituting the optical unit 4 although not easy to see in FIG. 3.

Figure 5:
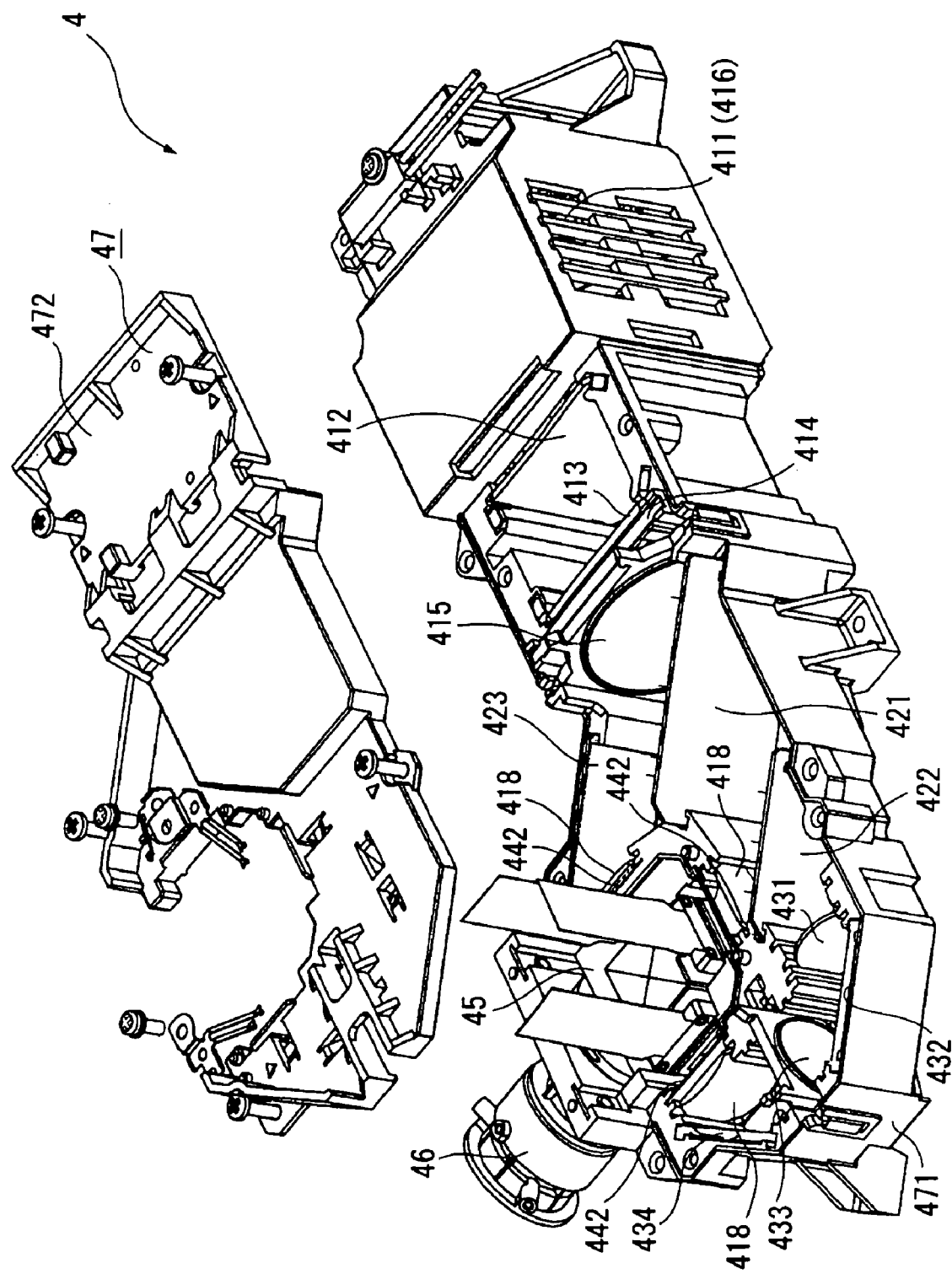
FIG. 5 is an exploded perspective view showing an optical unit constituting the projector.
Figure 6:
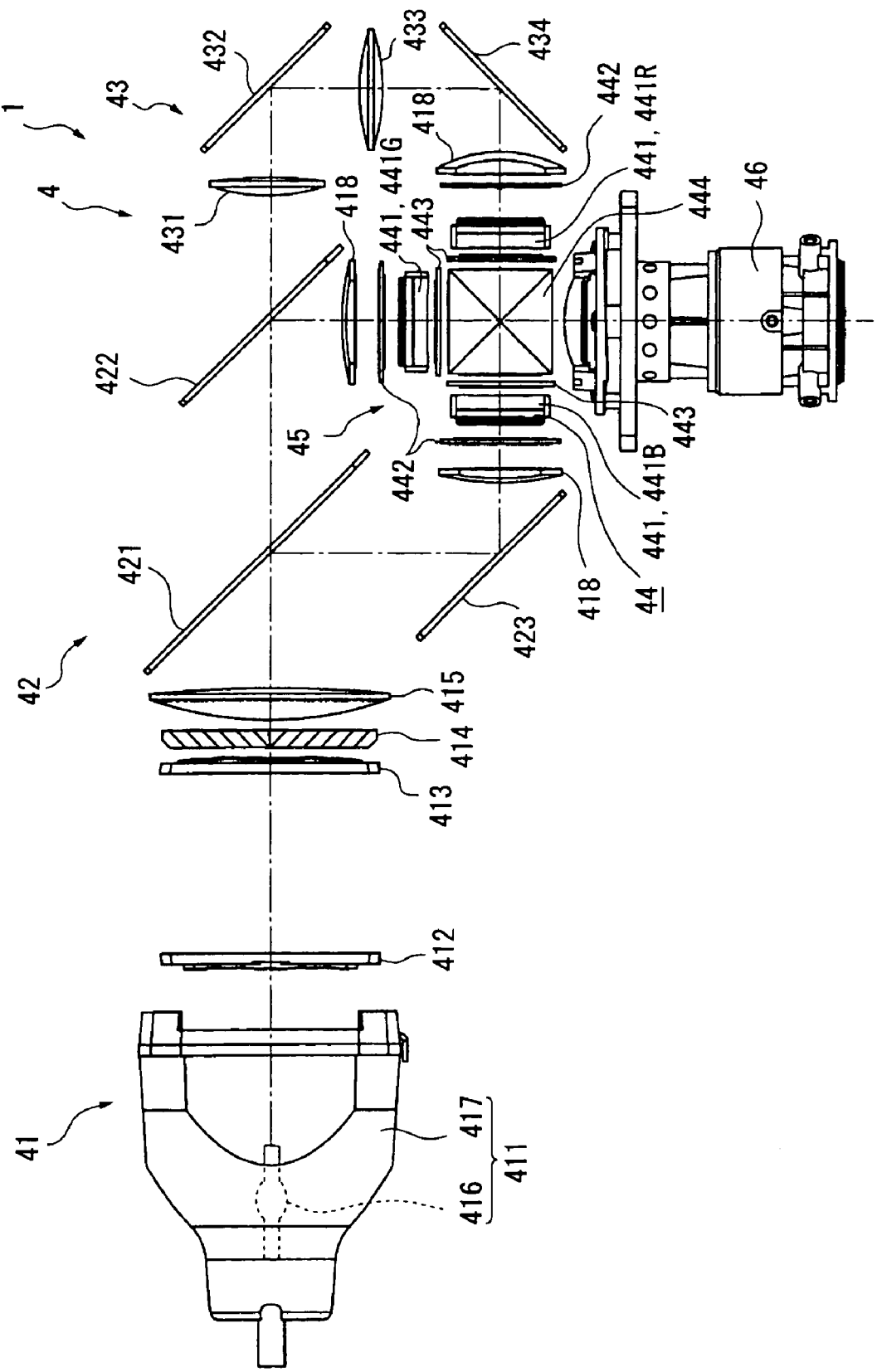
FIG. 6 is a typical view showing the optical unit.

Here, FIG. 5 is an exploded perspective view showing the optical unit 4. FIG. 6 is a view typically showing the optical unit 4.

The optical unit 4 is a unit for optically processing a luminous flux emitted from a light-source lamp 416 structuring the light-source device 411 and forming an optical image corresponding to image information, thereby projecting the optical image by magnification, as shown in FIG. 6. This has an integrator-illuminating optical system 41, color-separating optical system 42, a relay optical system 43, an optical device 44, a projection lens 46 and a synthetic resin light guide 47 (FIG. 5) accommodating these optical components 41–44, 46. The light guide 47 is structured, as shown in FIG. 5, having a lower light guide 471 formed with a groove for slidably fitting, from above, optical components 412–415, 418, 421–423, 431–434, 442, and an upper light guide 472 in a lid form for covering the upper opening of the lower guide 471.

The integrator-illuminating optical system 41 is an optical system for illuminating nearly uniform the image regions of three liquid-crystal panels 441 (liquid-crystal panels 441R, 441G and 441B assumably for respective colors of red, green and blue) constituting the optical device 44. This has a light-source device 411, a first lens array 412, a second lens array 413, a polarization converter element 414 and a superimposer lens 415.

The light-source device 411, has a light-source lamp 416 as a radiation light source and a reflector 417, to reflect a radiation rays of light projected from the light-source lamp 416 upon a reflector 417 into a collimated rays of light and to project the collimated rays of light to the outside. The light-source lamp 416 employs a high-pressure mercury lamp. Incidentally, a metal halide lamp, a halogen lamp or the like can be adopted besides the high-pressure mercury lamp. Meanwhile, the reflector 417 employs a parabolic mirror. Incidentally, a combination of a collimated concave lens and an elliptic mirror may be employed in place of the parabolic mirror.

The first lens array 412 has a structure arranged, in a matrix form, with small lenses having a contour nearly rectangular as viewed in an optical axis direction. Each small lens splits a luminous flux emitted from the light source lamp 416 into a plurality of partial luminous fluxes. Each small lens has a contour set to take an analogous form with a form of the image region of the liquid-crystal panel 441. For example, where the image region of the liquid-crystal panel 441 has an aspect ratio (horizontal-to-vertical size ratio) of 4:3, each small lens is set at an aspect ratio of 4:3.

The second lens array 413 has a structure nearly similar to the first lens array 412, i.e. a structure having small lenses arranged in a matrix form. The second lens array 413 has a function to focus images of the small lenses of the first lens array 412 onto the liquid-crystal panel 441, together with the superimposer lens 415.

The polarization converter element 414 is arranged between the second lens array 413 and the superimposer lens 415. The polarization converter element 414 is to convert the light from the second lens array 413 into one sort of polarization light. This enhances the light utilization efficiency on the optical device 44.

Specifically, the portions of light, converted into one sort of polarization light by the polarization converter element 414, are finally superimposed on the liquid-crystal panel 441 of the optical device 44 by the superimposer lens 415. Because the projector 1 using the liquid-crystal panel 441 of a type for modulating polarization light can utilize only one sort of polarization light, it does not utilize nearly a half of a luminous flux from the light-source lamp 416 issuing other sorts of random polarization light. For this reason, the use of the polarization converter element 414 converts every luminous flux emitted from the light-source lamp 416 into one sort of polarization light, thus enhancing the light utilization efficiency on the optical device 44. Incidentally, such a polarization converter element 414 is introduced in JP-A-8-304739, for example.

The color-separating optical system 42 has two dichroic mirrors 421, 422 and a reflecting mirror 423, and has a function that the dichroic mirrors 421, 422 separate a plurality of partial luminous fluxes exited from the integrator-illuminating optical system 41 into three colors of light of red (R), green (G) and blue (B).

The relay optical system 43 has an incident lens 431, a relay lens 433, reflecting mirrors 432, 434, and has a function to guide to the liquid-crystal panel 441R the red color of light as a color separated through the color-separating optical system 42.

On this occasion, the dichroic mirror 421 of the color-separating optical system 42 transmits red and green components of light of the luminous flux exited from the integrator-illuminating optical system 41, and reflects a blue component of light. The blue portion of light reflected by the dichroic mirror 421 is reflected upon the reflecting mirror 423, to reach a blue liquid-crystal panel 441B through a field lens 418. The field lens 418 converts each partial luminous flux exited from the second lens array 413 into a collimated luminous flux with respect to the axis (main beam of light) thereof. This is true for the field lens 418 provided on the liquid-crystal panel 441G, 441R at its light incident side.

Meanwhile, of the red and green of light transmitted the dichroic mirror 421, the green of light is reflected by the dichroic mirror 422 to reach a green liquid-crystal panel 441G through the field lens 418. On the other hand, the red of light transmits the dichroic mirror 422 and travels through the relay optical system 43 and further the field lens 418, thus reaching a red liquid-crystal panel 441R.

Incidentally, the reason of using the relay optical system 43 for red light is to prevent the utilization efficiency of light from lowering due to light scatter, etc. because red light has a optical path longer than the optical paths of other color of light. Namely, this is to allow the partial luminous flux entered the incident lens 431 to be conveyed to the field lens 418. Incidentally, although the relay optical system 43 is structured to pass red light of the three colors of light, this is not limitative, e.g., it may be structured to pass blue light.

The optical device 44 forms a color image from an entered luminous flux, demodulated according to image information. This has three incident polarizer plates 442 for the colors of light separated by the color-separating optical system 42 to enter, liquid-crystal panels 441R, 441G, 441B as light modulators arranged in rear stages to the incident polarizer plates 442, an exit polarizer plate 443 arranged in a rear stage to the liquid-crystal panels 441R, 441G, 441B, and cross dichroic prism 444 as a color-synthesizing optical system.

The liquid panels 441R, 441G, 441B use, for example, poly-silicon TFTs as switch elements.

In the optical device 44, the colors of light separated by the color-separating optical system 42 are modulated according to image information by the three liquid-crystal panels 441R, 441G, 441B, the incident polarizer plate 442 and the exit polarizer plate 443, to form an optical image.

The incident polarizer plate 442 transmits only the polarization light in a given direction among the colors of light separated by the color-separating optical system 42, and absorbs the other luminous flux. This is of a substrate such as of sapphire glass bonded with a polarization film. Meanwhile, the polarizer film may be bonded on the field lens 418 instead of using a substrate.

The exit polarizer plate 443 is structured nearly similar to the incident polarizer plate 442. This allows to transmit only the polarization light in a given direction among the luminous flux exited from the liquid-crystal panel 441 (441R, 441G, 441B), and absorbs the other luminous flux. Meanwhile, the polarizer film may be bonded on the cross dichroic prism 444 instead of using a substrate.

The incident polarizer plate 442 and the exit polarizer plate 443 are set up such that the polarization axes are orthogonal to each other.

The cross dichroic prism 444 synthesizes together the optical images exited from the exit polarizer plate 443 and modulated based on each color, thus forming a color image. In the cross dichroic prism 444, a dielectric multiplayer film for reflecting red light and a dielectric multiplayer film for reflecting blue light are provided nearly X-form along the interfaces of four rectangular prisms. By these dielectric multilayer films, three colors of light are synthesized together. The cross dichroic prism 444 like this is structured of optical glass.

The projection lens 46 magnifies and projects the color image synthesized by the cross dichroic prism 444 of the optical device 44.

Figure 7:
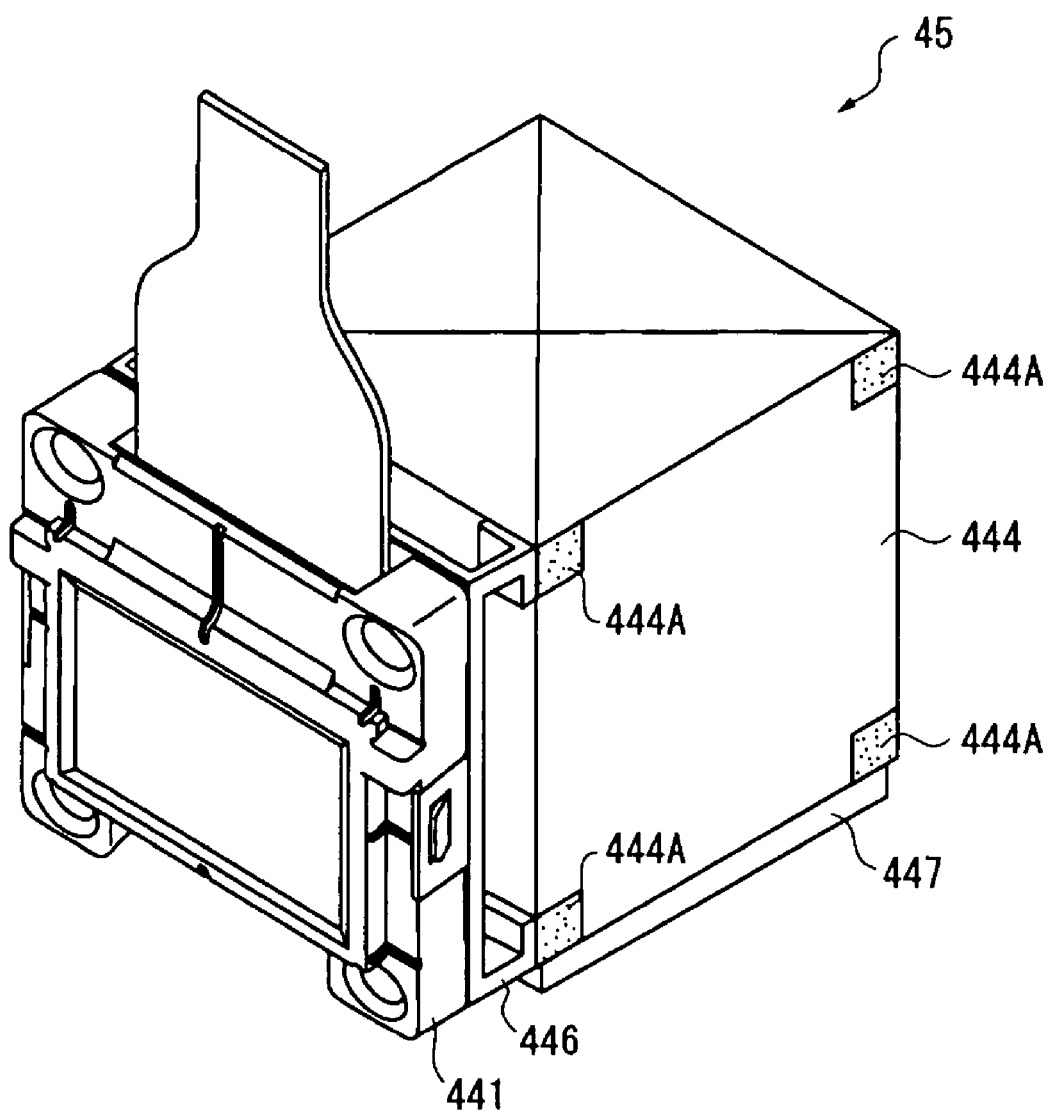
FIG. 7 is a perspective view showing an optical device main body.

The liquid-crystal panel 441, exit polarizer plate 443 and cross dichroic prism 444 explained so far are integrated into a unit structured as an optical device main body 45. FIG. 7 is a perspective view showing the optical device main body 45 while FIG. 8 is an exploded perspective view showing the optical device main body 45.

Figure 8:
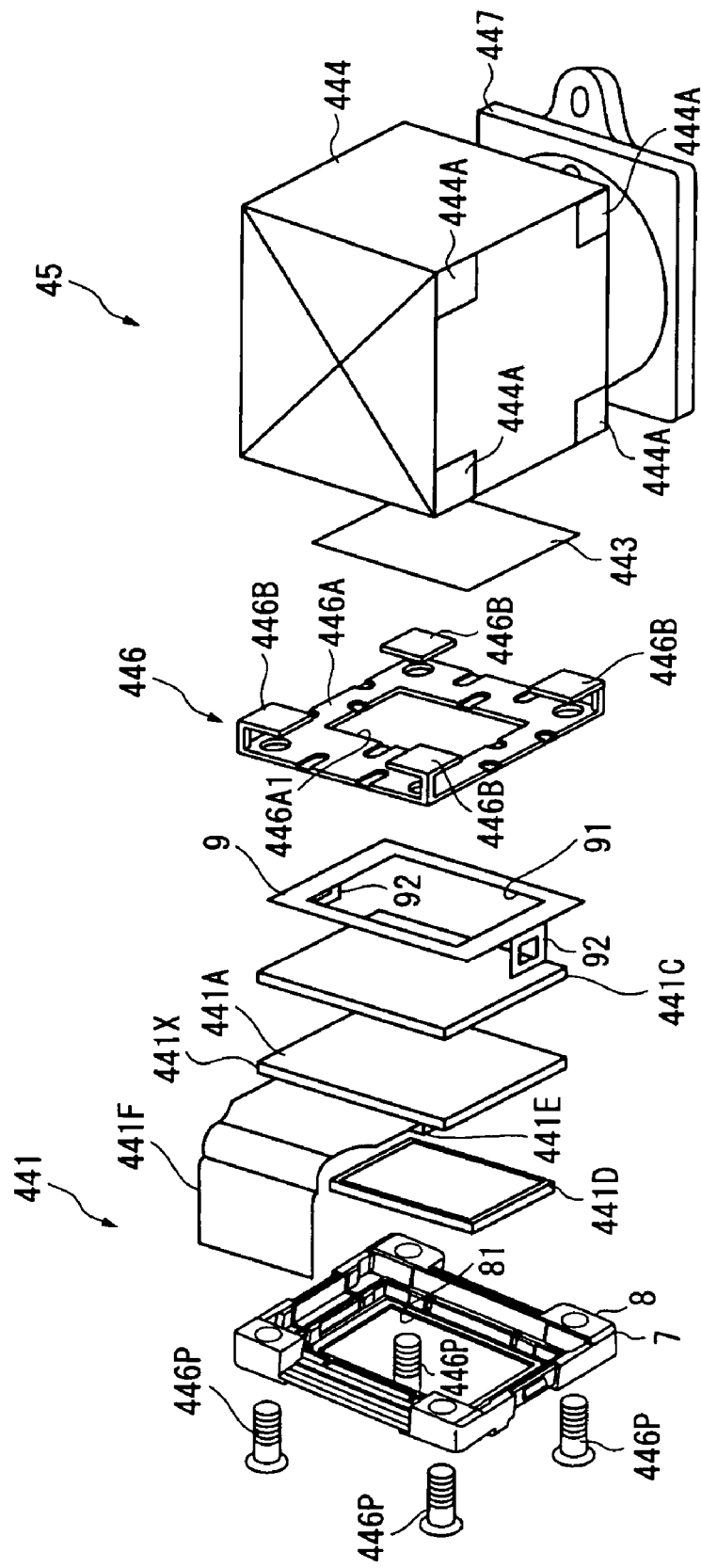
FIG. 8 is an exploded perspective view showing the optical device main body.
Figure 9:
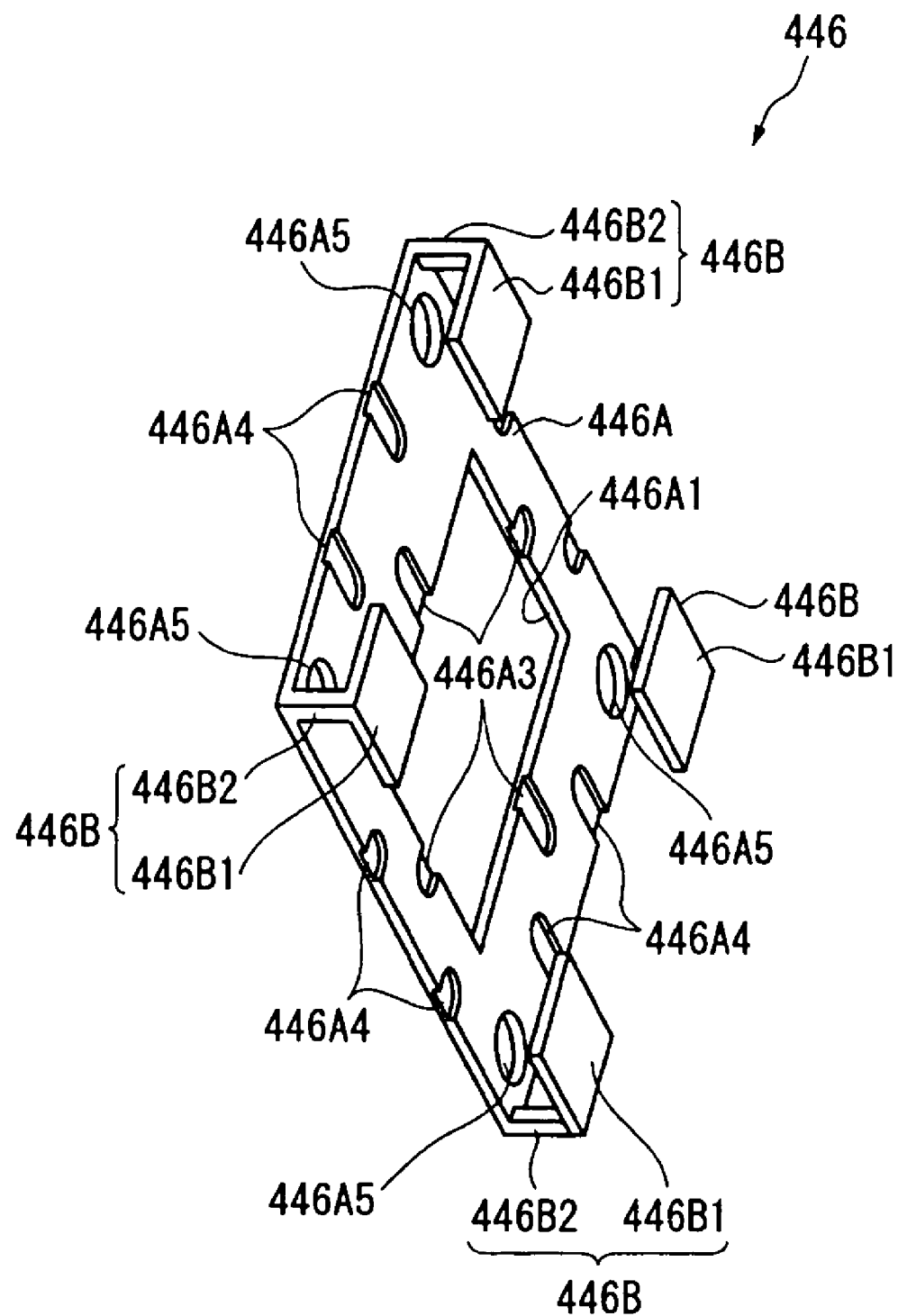
FIG. 9 is a perspective view showing a fixing plate of the optical device main body.

The optical device main body 45 has, as shown in FIGS. 7 and 8, a cross dichroic prism 444, a pedestal 447 fixed at an underside of the cross dichroic prism 444, a metal fixing plate 446 attached at a luminous-flux incident end face of the cross dichroic prism 444 and holding the exit polarizer plate 443, and a liquid-crystal panel 441 (441R, 441G, 441B) fixed at the luminous-flux incident side of the fixing plate 446 by four metal screws 446P.

The pedestal 447 is structured of magnesium alloy for example, the outer peripheral shape of which is nearly same as the cross dichroic prism 444.

The fixing plate 446 is attached on a luminous-flux exit side of the liquid-crystal panels 441R, 441G, 441B, to fix the liquid-crystal panels 441R, 441G, 441B at the luminous-flux incident end face of the cross dichroic prism 444 and to sustain the exit polarizer plate 443. The fixing plate 446 has an expansion coefficient of preferably $7.0 \times 10^{-6}$ or greater and $26 \times 10^{-6}$ or smaller. Particularly, it is preferably at or around an intermediate value in expansion coefficient of the cross dichroic prism 444 and a holder frame 8, referred later. In this embodiment, the fixing plate 446 of iron has an expansion coefficient of $1.2 \times 10^{-6}$.

This fixing plate 446 has a plate part 446A generally rectangular in plan formed with an opening 446A1 at the center, and leg parts 446B formed at four corners of the plate part 446A.

The plate part 446A is made in a shape to be received in the luminous-flux incident end face of the cross dichroic prism 444. Meanwhile, the opening 446A1 of the plate part 446A is formed corresponding to the image region of the liquid-crystal panel 441. In each of four sides of a luminous-flux exit surface of the plate part 446, there are alternately formed a first cutout 446A3 extending from the opening 446A1 toward the outer edge of the plate part 446A and generally orthogonal to a lengthwise direction of each side, and a second cutout 446A4 extending from the outer edge toward the opening 446A1 and generally orthogonal to a lengthwise direction of each side. The first cutouts 446A43 are formed one on each side (totally four) while the second cutouts 446A4 are formed two on each side (totally eight). Accordingly, the cutouts 446A3, 446A4 are totally 12 in the number.

The number of the first cutouts 446A3 and second cutouts 446A4 is the value resulting when the expansion coefficient of the fixing plate 446 is divided by the expansion coefficient of the cross dichroic prism 444, is rounded up in its decimal part into an integer, and then is multiplied by an integer. Namely, in this embodiment, the cross dichroic prism 444 is made of optical glass and has an expansion coefficient of $7.6 \times 10^{-6}$ while the fixing plate 446 is made of iron and has an expansion coefficient of $11.2 \times 10^{-6}$. Accordingly, the value the expansion coefficient of the fixing plate 446 is divided by the expansion coefficient of the cross dichroic prism 444 is 1.5. This, if made to an integer, gives a value 2. Accordingly, the number of the cutouts 446A3 and cutouts 446A4 is 12 that is given by 2 times 6.

Furthermore, the plate part 446A is formed with a hole 446A corresponding to a hole in a holder frame 8, referred later. The hole 446A5 and the hole 821 of the holder frame 8 are fixed together by screws 446P. This attaches the liquid-crystal panel 441 on the fixing plate 446, The leg part 446B has a fixing part 446B1 to be firmly fixed to the cross dichroic prism 444 and a connecting section 446B2 for connecting the fixing part 446B1 with the plate part 446A. The fixing parts 446B1 are soldered onto the metal layers 444A attached at the four corners of the cross dichroic prism 444. The connecting part 446B2 has a sectional area smaller than the planer area of the fixing part 446B1 so that the connecting part 446B2 can absorb a force caused due to a difference in expansion coefficient between the fixing plate 446 and the cross dichroic prism 444. The leg parts 446B may be integrally formed on the plate part 446A or separate members therefrom.

Meanwhile, the liquid-crystal panel 441, as shown in FIG. 8, is structured having a liquid-crystal panel main body (light modulator element) 441X generally rectangular in plan, anti-dust glass 441D, 441C closely bonded on the liquid-crystal panel main body 441X at its luminous-flux incident and exit sides, a holder 7 accommodating and holding therein the liquid-crystal panel main body 441X and anti-dust glass 441D, 441C.

The liquid-crystal panel main body 441X has a liquid crystal (light modulator proper) filled between a drive substrate (e.g. substrate formed with a plurality of line-formed electrodes, electrodes configuring pixels, TFT elements electrically connected between those) 441A and a counter substrate (e.g. substrate formed with a common electrode), thus having a structure that a control cable 441F extends between these substrates.

The liquid-crystal panel main body 441X has a diagonal dimension of the image region of 0.7 inches, for example.

The material structuring the drive substrate 441A and counter substrate 441E is preferably a material having a heat conductivity of 1 W/m·K or greater, e.g., quartz.

The anti-dust glass 441C, 441D are respectively secured on the drive substrate 441A and the counter substrate 441E by transparent adhesive or the like.

Those anti-dust glass 441C, 441D optically makes inconspicuous the dust adhered on a panel surface by deviating the panel surface position of the liquid panel 441 from a back focus position of the projection lens 46.

The material of structuring the anti-dust glass 441C, 441D is preferably a material having a conductivity of 1 W/m·K or greater, e.g., quartz.

Incidentally, although this embodiment used quartz or the like as a material of the drive substrate 441A, counter substrate 441E and the anti-dust glass 441C, 441D, this is not limitative, e.g., sapphire, rock crystal, flour and the like are usable.

The holder 7 has a holder frame 8 accommodating and sustaining the liquid-crystal panel main body 441X and the anti-dust glass 441C, 441D, and a frame-like member 9 for fixing under pressure the accommodated liquid-crystal panel main body 441X and anti-dust glass 441C, 441D.

The frame-like member 9 has an opening 91 for luminous-flux transmission in a rectangular form provided in a position corresponding to the image region of the liquid-crystal panel main body 441X. Meanwhile, hooks 92 are provided respectively at left and right of the frame-like member 9. By engaging the hooks 92 with hook engaging parts 832 referred later, the holder frame 8 and the frame-like member 9 are fixed together.

Next, the holder frame 8 is explained with reference to FIGS. 10 to 17. The holder frame 8 is a member generally rectangular in plan having a size corresponding to the liquid-crystal panel main body 441X having a diagonal of its image region of 0.7 inch. The holder frame 8 is structured of a material having an expansion coefficient of $7.0 \times 10^{-6}$ or greater and $26 \times 10^{-6}$ or smaller and a heat conductivity of 10 W/m·K or greater. Such materials include MG alloy, for example.

Incidentally, although this embodiment exemplified Mg alloy as a material of the holder frame 8, it should be understood that this is not limiting, i.e., Al alloy, Mo—Cu alloy, Ti alloy, Fe—Ni alloy and the like are usable.

Figure 10:
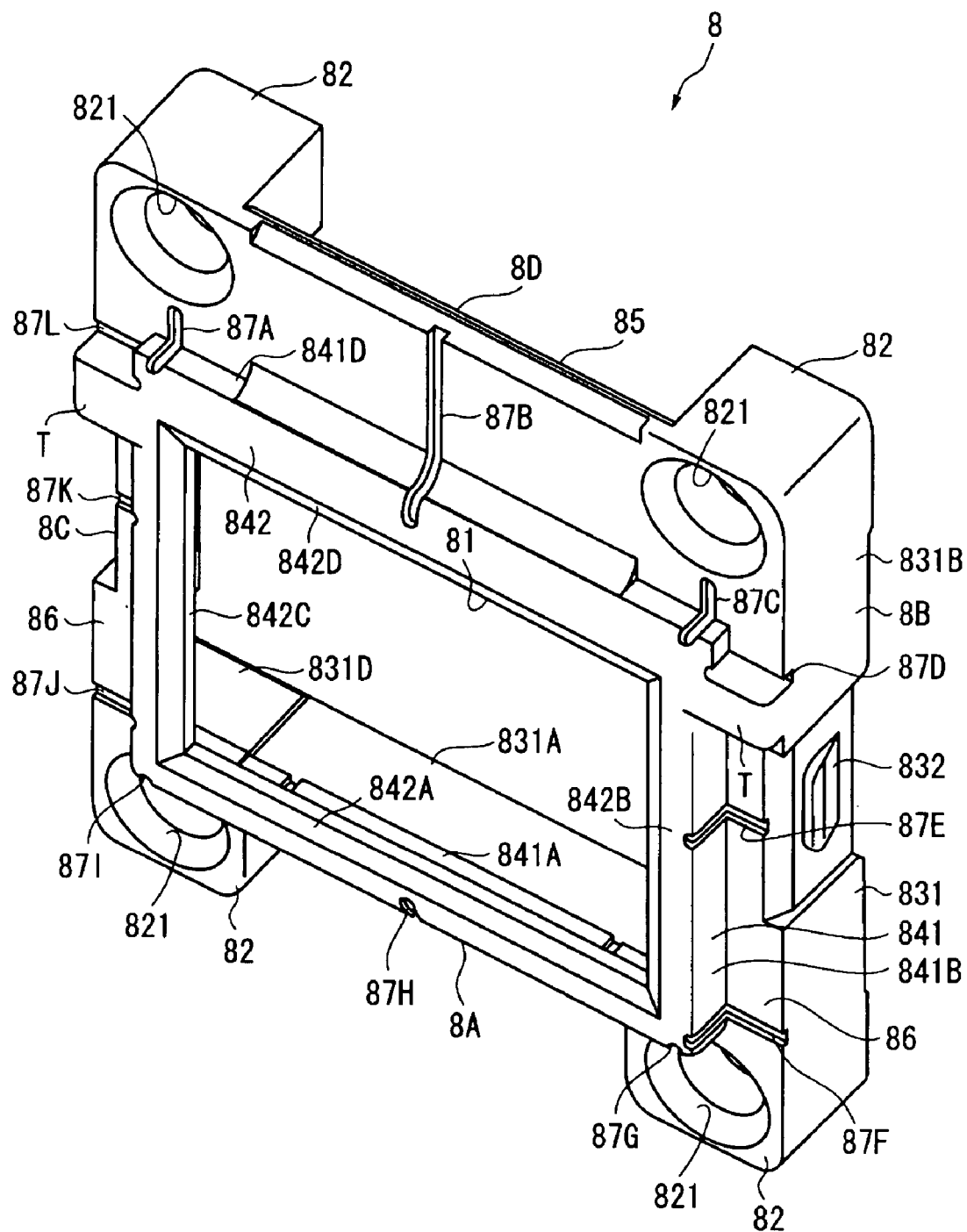
FIG. 10 is a perspective view showing a holder frame of the optical device main body.

An opening 81 for luminous-flux transmission in a rectangular form is provided in the holder frame 8 in a position corresponding to the image region of the liquid-crystal panel main body 441X, as shown in FIG. 10.

Meanwhile, quadrangular-prism fixing parts 82 are formed at four corners of the holder frame 8. The fixing part 82 is formed with a hole 821. Here, it is assumed that a pair of longer sides of the holder frame 8 are longer sides 8A, 8D while a pair of shorter sides are shorter sides 8B, 8C.

Figure 11:
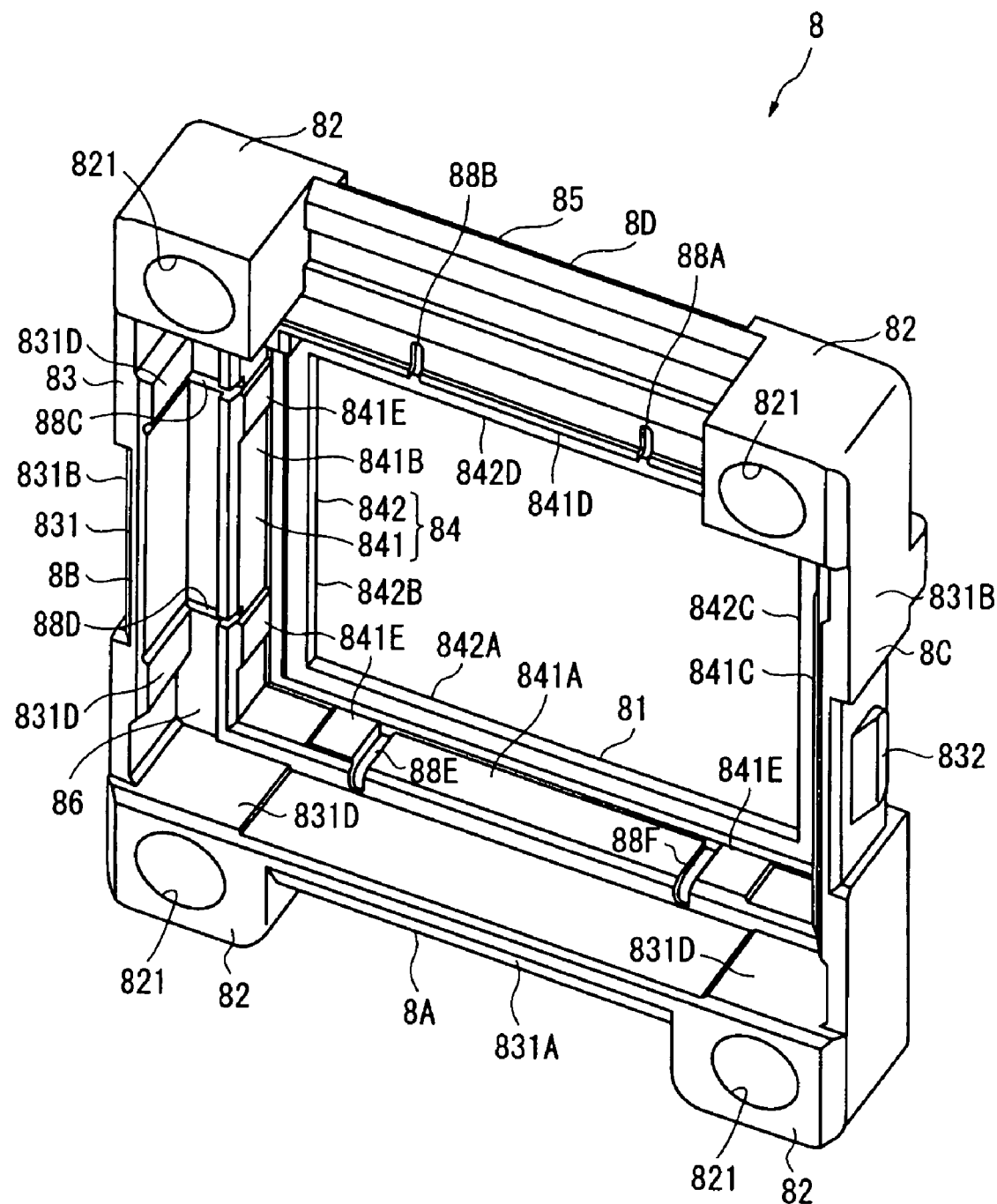
FIG. 11 is a perspective view of the holder frame as viewed in the direction different from FIG. 10.
Figure 12:
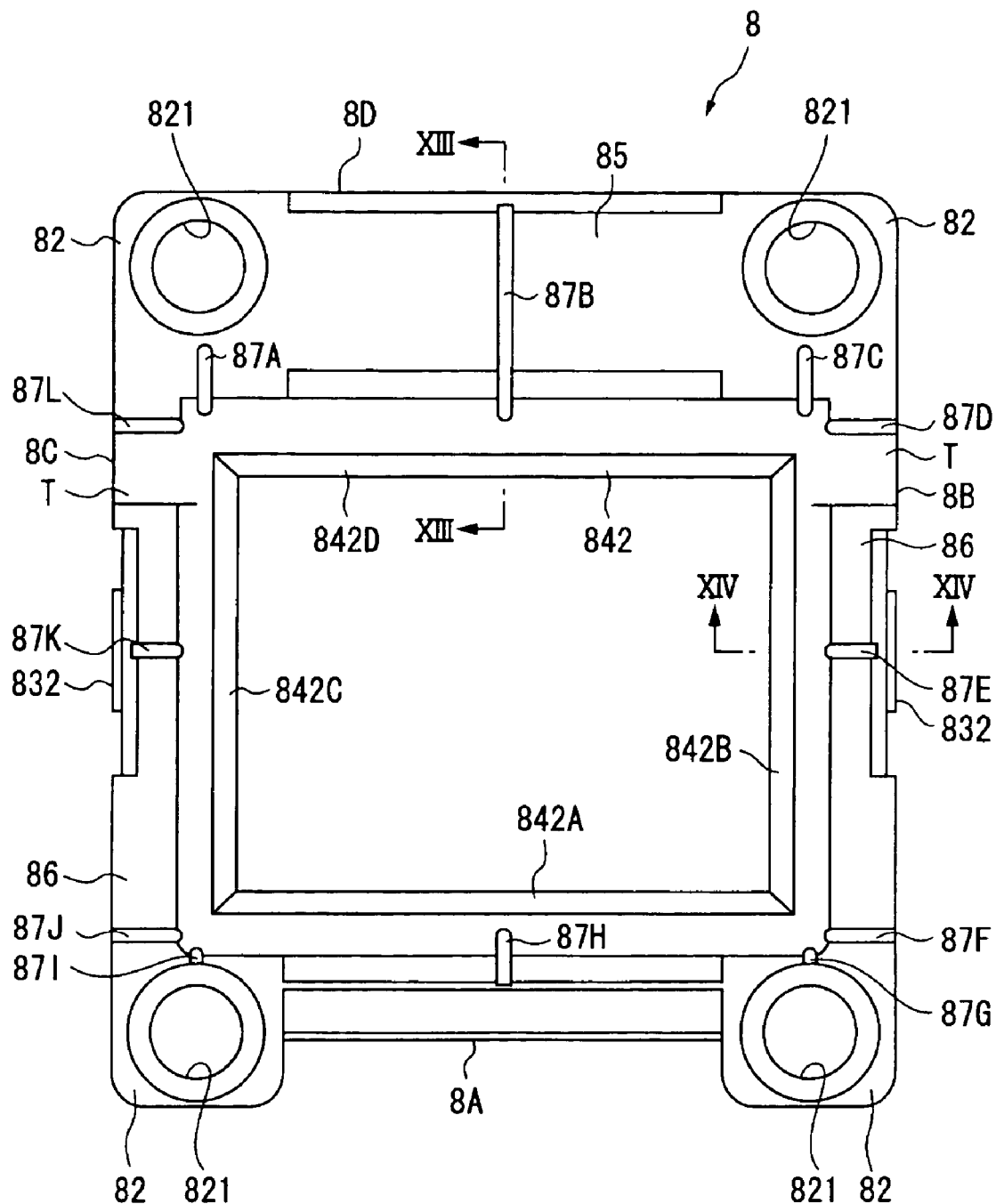
FIG. 12 is a plan view of the holder frame.

As shown in FIG. 11, the holder frame 8 has a first accommodating part 83 accommodating the anti-dust glass 441C and the drive substrate 441A, and second accommodating part 84 accommodating the anti-dust glass 441D and the counter substrate 441E.

The first accommodating part 83 has a first outer peripheral wall 831 for holding the side surface of the anti-dust glass 441C and drive substrate 441A. The first outer peripheral wall 831, configuring the shorter sides 8C, 8B and the longer side 8A of the holder frame 8, has a pair of shorter sides 831B, 831C and a longer side 831A, thus being made generally in a squared-U form in plan opened at the side opposite to the longer side 831A. Although the first outer peripheral wall 831 connects a fixing part 82, a flat-plate part 85 is arranged between two fixing parts 82 not connected by the first outer peripheral wall 831 (between two fixing parts 82 arranged on the opening side opposite to the longer side 831A of the first outer peripheral wall 831). The flat-plate part 85 extends nearly parallel with a luminous-flux incident surface of the anti-dust glass 441C and drive substrate 441A accommodated in the first accommodating part 83. The control cable 441F mentioned before is laid on the flat-plate part 85.

On an accommodating surface (surface close to the anti-dust glass 441C and drive substrate 441A) of the first outer peripheral wall 831, there is formed a positioning projection 831D for positioning the anti-dust glass 441C and drive substrate 441A.

Meanwhile, hook engaging parts 832 are formed on the outer surfaces of the one pair of shorter sides 831B, 831C of the first outer peripheral wall 831 (back surfaces to the accommodating surfaces close to the anti-dust glass 441C and drive substrate 441A) in positions corresponding to the hooks 92 of the foregoing frame-like member 9.

A second accommodating section 84 has an outer diameter smaller than the outer diameter of the first accommodating section 83, to project toward the luminous-flux incident side with respect to the first accommodating section 83. The second accommodating section 84 has a second outer peripheral wall 841 for holding the side surface of the anti-dust glass 441D and counter substrate 441E, and a fixing wall 842 for fixing the anti-dust glass 441D at its outer periphery of luminous-flux incident surface.

The second outer peripheral wall 841 is generally rectangular in plan, and has a pair of shorter sides 841B, 841C configuring the shorter sides 8B, 8C of the holder frame 8, and a pair of longer sides 841A, 841D configuring the longer sides 8A, 8D of the holder frame 8.

On an accommodating surface (surface close to the anti-dust glass 441D and drive substrate 441E) of the second outer peripheral wall 841, there is formed a positioning projection 841E for positioning the anti-dust glass 441D and counter substrate 441E. Meanwhile, between the shorter side 841B of the second outer peripheral wall 841 and the shorter side 831B of the first outer peripheral wall 831 and between the shorter side 841C of the second outer peripheral wall and the shorter side 831C of the first outer peripheral wall 831, there are provided connection walls 86 connecting these shorter sides together. The connection wall 86 is generally orthogonal to the shorter side 841B, 841C of the second outer peripheral wall 841 and to the shorter side 831B, 831C of the first outer peripheral wall 831.

Incidentally, no connection wall is provided between the longer side 841A of the second outer peripheral wall 841 and the longer side 831A of the first outer peripheral wall 831.

As shown in FIG. 10, on the luminous-flux incident surface of the connection wall 86 and in the vicinity of the fixing part 82 connected by the flat-plate part 85, a convex T is formed bestriding a luminous-flux incident surface of the connecting wall 86 and a luminous-flux incident surface of the second outer peripheral wall 841 and the fixing wall 842 of the second accommodating part 84.

Meanwhile, as shown in FIG. 11, the second outer peripheral wall 841 has an end face close to the first outer peripheral wall 831 projecting toward the first outer peripheral wall 831 with respect to the connection wall 86 and abutting against the outer periphery on the luminous-flux incident surface of the drive substrate 441A accommodated in the first accommodating part 83.

The fixing wall 842 is provided at a side opposite to the first outer peripheral wall 831 with respect to the second outer peripheral wall 841 in a manner nearly orthogonal to the second outer peripheral wall 841, to abut against the luminous-flux incident surface of the anti-dust glass 441D. This fixing wall 842 is formed with the foregoing opening 81 in the center thereof. The fixing wall 842 has a pair of longer sides 842A, 842D and a pair of shorter sides 842B, 842C.

In the four sides of the luminous-flux incident surface of the holder frame 8, there are formed a plurality of cutouts 87A–87L extending from a vicinity of the opening 81 toward the outer edge of the luminous-flux incident surface and nearly orthogonal to the longitudinal direction of each side. These cutouts 87A–87L are formed by being cut out in a manner being dented in the luminous-flux incident surface toward the accommodating surface in the backside (flat-plate part 85 is on the side the control cable 441F of the liquid-crystal panel main body 441x is provided). In this embodiment, cutouts are formed, e.g. three, in each side of the luminous-flux incident surface of the holder frame 8, which are twelve in the total number.

The cutouts 87A, 87C are respectively formed in the longitudinal ends of the longer side 8D of the holder frame 8. The cutout 87A, 87C extends from the longer side 842D of the fixing wall 842 to a vicinity of the hole 821 of the fixing part 82 through the longer side 841D of the second outer peripheral wall 841.

Figure 13:
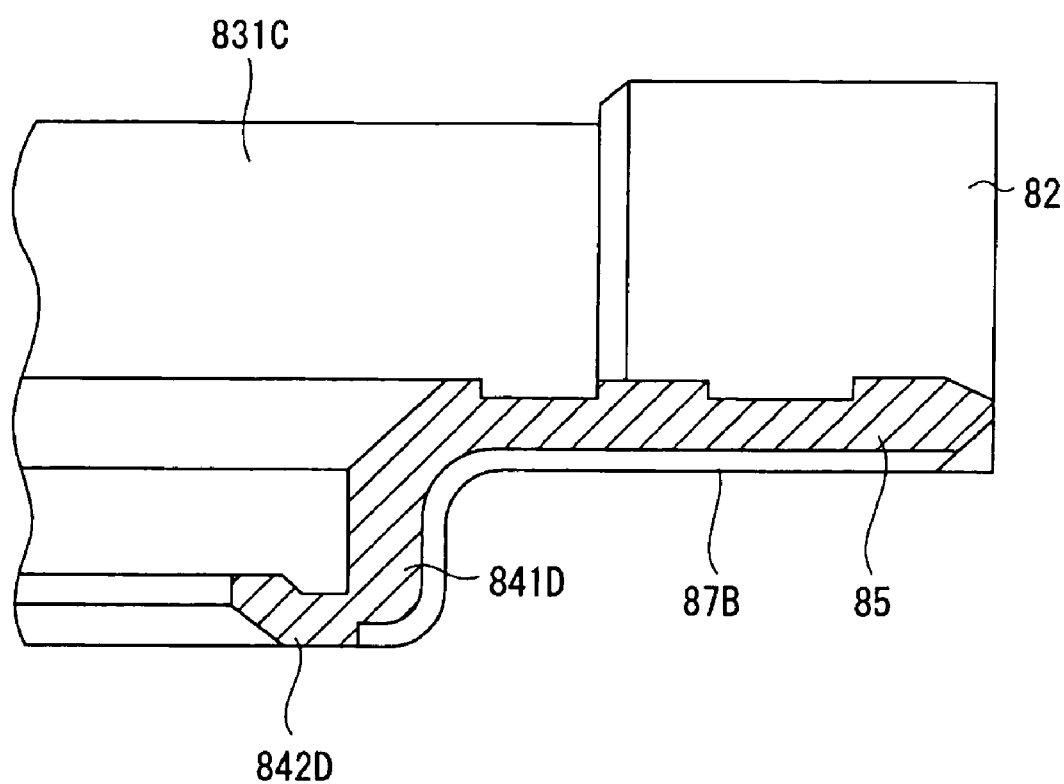

The cutout 87B is formed in the longer side 8D of the holder frame 8 nearly at a longitudinal center thereof. The cutout 87B extends from the longer side 842D of the fixing wall 842 to a vicinity of the outer edge of the flat-plate part 85 through the longer side 841D of the second outer peripheral wall 841, as also shown in FIG. 13. Incidentally, FIG. 13 is a sectional view taken along the cutout 87B of the holder frame 8, which is a sectional view in the direction XIII—XIII in FIG. 12.

The cutout 87D is formed in one end of the shorter side 8B of the holder frame 8. This is made by cutting the convex T out of the shorter side 842B of the fixing wall 842, to extend to the connection wall 86.

Furthermore, the cutout 87E is formed in the shorter side 8B of the holder frame 8 nearly at a longitudinal center thereof. This is made by cutting out the shorter side 842B of the fixing wall 842, the shorter side 841B of the second outer peripheral wall 841 and the connection wall 86. This cutout 87E extends from a boundary between the shorter side 842B of the fixing wall 842 and the shorter side 841B of the second outer peripheral wall 841 to a vicinity of a boundary between the connection wall 86 and the shorter side 831B of the first outer peripheral wall 831, as also shown in FIG. 14. Incidentally, FIG. 14 is a sectional view taken along the cutout 87E of the holder frame 8, which is a sectional view in the direction XIV—XIV in FIG. 12.

The cutout 87F is formed in the other end of the shorter side 8B of the holder frame 8 in a manner orthogonal to a lengthwise of the shorter side 8B. This is made by cutting from a boundary between the shorter side 842B of the fixing wall 842 and the shorter side 841B of the second outer peripheral wall 841 to a boundary between the connection wall 86 and the shorter side 831B of the first outer peripheral wall 831.

Furthermore, the cutout 87G and the cutout 87I are respectively formed in the ends of the longer sides 8D of the holder frame 8. This extends from the longer side 842A of the fixing wall 842 to a vicinity of the hole 821 in the fixing part 82 through the longer side 841A of the second outer peripheral wall 841.

The cutout 87H is formed nearly in the center of the longer side 8D of the holder frame 8. This is made by cutting out the longer side 842A of the fixing wall 842 and the longer side 841A of the second outer peripheral wall 841.

The cutouts 87J–87L are formed in the shorter side 8C of the holder frame 8, which are respectively formed substantially similarly to the opposite cutouts 87F–87D with respect to the opening 81.

Meanwhile, in the four sides of the accommodating surface accommodating the anti-dust glass 441C, drive substrate 441A, anti-dust glass 441D and counter substrate 441, a plurality of cutouts 88A–88H are formed extending from a vicinity of the opening 81 toward the outer edge of the accommodating surface and generally orthogonal to the lengthwise of each side, as shown in FIGS. 11 and 15. These cutouts 88A–88H are formed by being cut out in a manner dented in the accommodating surface toward the luminous-flux incident surface of the backside.

In this embodiment, two cutouts are formed in each side of the accommodating surface, which are eight in the total number, for example. The cutouts in each side of the accommodating surface of the holder frame 8 are formed in positions between the cutouts formed in each side of the luminous-flux incident surface of the holder frame 8 as viewed from the side of luminous-flux incidence. Namely, in each side of the holder frame 8, alternately arranged are the cutouts formed in the accommodating surface and the cutouts formed in the luminous-flux incident surface.

The cutout 88A is formed in a vicinity of one end lengthwise of the longer side 8D of the holder frame 8, to position between the cutout 87A and the cutout 87B. The cutout 88B is formed in a vicinity of the other end lengthwise of the longer side 8D of the holder frame 8, to position between the cutout 87B and the cutout 87C. These cutouts 88A and 88B extend from the longer side 841D of the second outer peripheral wall 841 to a vicinity of the flat-plate part 85, as also shown in FIG. 16. FIG. 16 is a sectional view in a direction XVI—XVI in FIG. 15.

The cutout 88C is formed in a vicinity of one end lengthwise of the shorter side 8B of the holder frame 8, to position between the cutout 87D and the cutout 87E. The cutout 88D is formed in a vicinity of the other end lengthwise of the shorter side 8B of the holder frame 8, to position between the cutout 87E and the cutout 87F. These cutouts 88C, 88D extend from a vicinity of the connection wall 86 of the shorter side 841B of the second outer peripheral wall 841 to the first outer peripheral wall 831 through the connection wall 86.

The cutout 88E is formed in a vicinity of one end lengthwise of the longer side 8A of the holder frame 8, to position between the cutout 87G and the cutout 87H. The cutout 88F is formed in a vicinity of the other end lengthwise of the longer side 8A of the holder frame 8, to position between the cutout 87H and the cutout 87I. These cutouts 88E, 88F extend from the longer side 841A close to the fixing wall of the second outer peripheral wall 841 toward the longer side 831A of the first outer peripheral wall 831.

Incidentally, the first outer peripheral wall 831 is not cut by the cutouts 88E and 88F.

The cutout 88G is formed in a vicinity of one end lengthwise of the shorter side 8C of the holder frame 8, to position between the cutout 87J and the cutout 87K. The cutout 88H is formed in a vicinity of the other end lengthwise of the shorter side 8C of the holder frame 8, to position between the cutout 87K and the cutout 87L. These cutouts 88G, 88H extend from a vicinity of the connection wall 86 of the shorter side 841C of the second outer peripheral wall 841 to the first outer peripheral wall 831 through the connection wall 86, as also shown in FIG. 17. FIG. 17 is a sectional view in a direction XVII—XVII in FIG. 15.

The number of the cutouts formed in each side of the holder frame 8 can be determined in the following manner.

Provided that the exterior air of the holder frame 8 has a temperature change T, the holder frame 8 has an expansion coefficient $\alpha 1$, the substrate 441A, 441E has an expansion coefficient $\alpha 2$, the gap previously set between the accommodating surface of the holder frame 8 and the substrate 441A, 441E has a dimension X and the accommodating surface of the holder frame 8 has a one-side length L, then the number of cutouts to be formed in one side of the accommodating surface and luminous-flux incident surface is given as the number greater than the value which is calculated by $\{T(\alpha 1-\alpha 2)L\}/X$ and then is changed to an integer value. For example, when the exterior air temperature of the holder frame 8 changes from 25° C. to −20° C., T=45 results. Meanwhile, in this embodiment, because the holder frame 8 is made of Mg alloy, the holder frame 8 has an expansion coefficient $\alpha 1 = 26 \times 10^{-6}$. Furthermore, in this embodiment, because the substrate 441A, 441E is of quartz, the expansion coefficient $\alpha 2$ is $0.58 \times 10^{-6}$. Meanwhile, provided that the gap X has a dimension 0.01 mm, the longer side of the accommodating surface has a length 18.1 mm and the shorter side has a length 14.7 mm, then $\{T(\alpha 1-\alpha 2)L\}/X = 2.1$ or 1.7 results. Accordingly, in case these values are rounded at decimal part, the number of the cutouts to be formed in each side of the holder frame 8 is determined two or more. Therefore, this embodiment forms two cutouts in each side of the accommodating surface and three in each side of the luminous-flux incident surface.

Therefore, the present embodiment is capable of offering the following effects.

Usually, when the holder frame 8 contracts, a contraction force takes place in a lengthwise direction of each side of the holder frame 8. In the accommodating surface and luminous-flux incident surface of the holder frame 8, because cutouts 87A–87L and cutouts 88A–88H are formed extending from a vicinity of the opening 81 toward the outer edge and orthogonal to a lengthwise direction of each side, the contracting force of the holder frame 8 can be weakened. This can relax the force of the holder frame 8 compressing the outer periphery of the liquid-panel main body 441X and anti-dust glass 441C, 441D. Accordingly, the gap between the substrates 441A, 441E can be kept at a predetermined dimension. It is possible to prevent against a transmittance change in a transmitting luminous flux as caused by a gap change between the substrates 441A, 441E, and a color unevenness resulting from the transmittance change.

Meanwhile, by forming the cutouts 87A–87L and cutouts 88A–88H in the holder frame 8, the substrates 441A, 441E can be prevented from being compressed by the holder frame 8. Accordingly, there is no need to increase the gap between the holder frame 8 and the substrate 441A, 441E. Consequently, the substrates 441A, 441E can be prevented from deviating in position within the holder frame 8. Furthermore, pixel deviation can also be prevented from occurring due to positional deviation of the substrates 441A, 441E.

Furthermore, because of no need of securing a gap great between the holder frame 8 and the substrate 441A, 441E, light can also be prevented from leaking through between the holder frame 8 and the substrate 441A, 441E.

In this embodiment, because the cutouts 87A–87L and cutouts 88A–88H are formed respectively in the four sides of the holder frame 8, it is possible to positively reduce the force compressing the substrate 441A, 441E upon contraction of the holder frame 8.

Furthermore, by respectively forming cutouts 87A–87L and cutouts 88A–88H in the four sides of the holder frame 8, it is possible to positively prevent an occurrence of warp or strain upon contraction of the holder frame 8. Particularly, this embodiment alternately arranges the cutouts 87A–87L formed in the luminous-flux incident surface of the holder frame 8 and the cutouts 88A–88H formed in the accommodating surface. Because there is no possibility of overlap of the cutouts formed in the accommodating surface and luminous-flux incident surface, there encounters no extreme reduction of strength in the region where the cutout is formed. This can more positively prevent a warp or strain from occurring due to a contraction of the holder frame 8.

Provided that the exterior air of the holder frame 8 has a temperature change T, the holder frame 8 has an expansion coefficient $\alpha 1$, the substrate 441A, 441E has an expansion coefficient $\alpha 2$, the gap previously set between the accommodating surface of the holder frame 8 and the substrate 441A, 441E has a dimension X and the accommodating surface of the holder frame 8 has a one-side length L, then the number of cutouts to be formed in one side of the accommodating surface and luminous-flux incident surface is given as the number equal to or greater than the value which is calculated by $\{T(\alpha 1-2)L\}/X$ and then is changed to an integer value. Accordingly, it is possible to reduce the difference between the contraction ratio of the holder frame 8 in a low temperature state and the contraction ratio of the substrate 441A, 441E. This can positively prevent the substrate 441A, 441E from being compressed by contraction of the holder frame 8. Furthermore, occurrence of color unevenness can be prevented.

Meanwhile, of the cutouts 88A–88H formed in the accommodating surface of the holder frame 8, the cutouts 88A, 88B, 88E, 88F formed in the longer side 8D and longer side 8A are cut in a manner bestriding the second outer peripheral wall 841 of the second accommodating part 84. However, the cutouts 88C, 88D, 88G, 88H formed in the shorter side 8B, 8C are formed by cutting only a part (part in a vicinity of the connection wall 86) of the second outer peripheral wall 841. By thus making the cutouts 88C, 88D, 88G, 88H in a structure that the second outer peripheral wall 841 is cut only in a part thereof, the strength of the second accommodating part 84 can be secured to a predetermined value or more.

Meanwhile, in this embodiment, because the cutouts 88E, 88F formed in the longer side 8A were made in a structure without cutting the first outer peripheral wall 831, the strength of the first accommodating part 83 can be secured to a predetermined value or more.

In this embodiment, the substrates 441A, 441E and anti-dust glass 441D, 441C are structured of a material having a heat conductivity of 1 W/m·K or greater, e.g. quartz. Accordingly, the heat caused on the liquid-crystal main body 441X is allowed to dissipate to the holder frame 8 through the substrates 441A, 441E and anti-dust glass 441D, 441C. Meanwhile, by forming the substrates 441A, 441E and anti-dust glass 441D, 441C with a material having a high heat conductivity, the substrate 441A, 441E can be made uniform in respect of in-plane temperature distribution, preventing more positively thermal strain occurrence and color unevenness occurrence due to such thermal strain.

Furthermore, by making the holder frame 8 of Mg alloy and providing it with a heat conductivity as high as 10 W/m·K in heat conductivity, it is possible to release the heat transferred from the substrate 441A, 441E of the liquid-crystal panel main body 441X to the holder frame 8. This makes uniform the in-plane temperature distribution on the substrate 441A, 441E, positively preventing against the heat strain caused by the substrate 441A, 441E.

Meanwhile, in the four sides of the luminous-flux exit surface of the fixing plate 446, because there are formed the first cutout 446A3 and the second cutout 446A4 that extend orthogonal to the lengthwise of each side, the fixing plate 446 can be suppressed from expanding/contracting. This can prevent the liquid-crystal panel 441 from being applied by a deforming force of expansion and contraction of the fixing plate 446. Thus, the gap between the substrates 441A, 441E of the liquid-crystal panel 441 can be kept at a predetermined dimension. Accordingly, it is possible to prevent a transmittance change of transmitting luminous flux as caused by a change of the gap between the substrates 441A, 441E, and an occurrence of color unevenness due to a transmittance change.

Meanwhile, the holder frame 8 and the fixing plate 446 are fixed together by screws 446P. Accordingly, where there is a great difference between the contraction ratio of the holder frame 8 and the contraction ratio of the fixing plate 446, the fixing plate 446 or the holder frame 8 is possibly deformed about the screw 446P by the force resulting from the difference in contraction ratio. On the contrary, in this embodiment, cutouts are formed in both the holder frame 8 and the fixing plate 446 to thereby reduce the contraction ratio of the holder frame 8 as well as the contraction ratio of the fixing plate 446. Hence, it is possible to prevent the deformation caused by a difference in contraction ratio.

Because the fixing plate 446 is formed with the first cutout 446A3 and the second cutout 446A4, the fixing plate 446 can be suppressed from expanding/contracting. Thus, the expansion/contraction ratio of the fixing plate 446 can be approximated to the expansion/contraction ratio of the cross dichroic prism 444. This can reduce the force caused by a difference in expansion/contraction ratio between the fixing plate 446 and the cross dichroic prism 444, making it possible to prevent a positional deviation of the fixing plate 446 relative to the cross dichroic prism 444 and further a positional deviation of the liquid-crystal panel 441 fixed on the fixing plate 446. Because of the capability of preventing against a positional deviation of the liquid-crystal panel 441, pixel deviation can be also prevented that is to occur due to positional deviation of the liquid-crystal panel 441.

Meanwhile, in the plate part 446A of the fixing plate 446, there are alternately formed, on each side, the first cutout 446A3 extending from the opening 446A1 toward the outer edge and the second cutout 446A4 extending from the outer edge toward the opening 446A1. Accordingly, warp can be prevented that is to occur upon expansion/contraction of the fixing plate 446.

The number of the cutouts 446A3, 446A4 is the value resulting when the expansion coefficient of the fixing plate 446 is divided by the expansion coefficient of the cross dichroic prism 444, is rounded up in its decimal part into an integer, and then is multiplied by an integer. By making the number of cutouts 446A3, 446A4 as the above number, it is possible to reduce the difference between the expansion/contraction ratio of the fixing plate 446 and the expansion/contraction ratio of the cross dichroic prism 444. Accordingly, it is possible to positively prevent a positional deviation of the fixing plate 446 relative to the cross dichroic prism 444 and furthermore a positional deviation of the liquid-crystal panel 441 fixed on the fixing plate 446. This can prevent pixel deviation as caused by a positional deviation of the liquid-crystal panel 441.

Furthermore, in this embodiment, because one first cutout 446A3 is formed per side while two second cutouts 446A3 are formed per side, the strength of the fixing plate 446 can be secured at a predetermined value or more.

Meanwhile, in this embodiment, the expansion coefficient of the fixing plate 446 was taken as a value at or around the intermediate value of the expansion coefficient of the holder frame 8 and the expansion coefficient of the cross dichroic prism 444. Accordingly, the difference is reduced between the expansion coefficient of the holder frame 8 and the expansion coefficient of the cross dichroic prism 444.

Namely, because of a reduced difference between the expansion coefficient of the holder frame 8 and the expansion coefficient of the fixing plate 446, the holder frame 8 can be positively prevented from being applied by a force caused by expansion/contraction of the fixing plate 446, making it possible to prevent a transmittance change of transmitting luminous flux through the liquid-crystal panel 441 and furthermore an occurrence of color unevenness due to a transmittance change.

Meanwhile, because of a reduced difference between the expansion coefficient of the holder frame 8 and the expansion coefficient of the cross dichroic prism 444, it is possible to positively prevent a positional deviation of the fixing plate 446 relative to the cross dichroic prism 444 and furthermore a pixel deviation caused by the positional deviation.

Incidentally, it should be understood that the invention is not limited to the foregoing embodiment but the modifications, revisions, etc. within the scope the object of the invention is to be achieved are included in the invention.

For example, in the foregoing embodiment, although the substrates 441A, 441E are made of quartz, this is not limitative. For example, the substrates may be structured of a material, such as sapphire, rock crystal or the like.

Because such a material is extremely high in thermal conductivity, by structuring a substrate of such a material, the substrate can be made more uniform in in-plane temperature distribution, making it possible to effectively prevent thermal strain occurrence.

Furthermore, in the foregoing embodiment, although the holder frame 8 was made of Mg alloy, this is not limitative. For example, the holder frame 8 may be structured of a material, such as Mo—Cu alloy, PPS (polyphenylene sulfide), Al alloy, Fe—Ni alloy or Ti alloy.

Meanwhile, in the foregoing embodiment, the liquid-crystal panel main body 441X has an image region with a diagonal dimension of 0.7 inch, to adopt a holder frame 8 in a size suited for the liquid-crystal panel main body 441X. However, this is not limitative. The image region of the liquid-crystal panel main body 441X may be in a diagonal dimension of 0.5 inch, 0.9 inch or 1.3 inches. In this case, the number of cutouts to be formed in each side of the holder frame is preferably two or more for 0.5 inch, three or more for 0.9 inch, four or more for 1.3 inches, four or more for 1.5 inches, and five or more for 1.8 inches.

Furthermore, in the foregoing embodiment, although the substrates 441A, 441E and the anti-dust glass 441C, 441D were structured of the same material, this is not limitative, i.e., may be structured of different materials. On this occasion, the holder frame 8 compresses the outer periphery of the anti-dust glass or the substrate which is smaller in compression ratio. For example, in the case that the holder frame compresses the outer periphery of the anti-dust glass, the pair of substrate is compressed through the anti-dust glass, possibly changing the spacing between the substrates. In this case, the number of cutouts to be formed on each side of the holder frame 8 is: provided that the exterior air of the holder frame 8 has a temperature change T, the smaller expansion coefficient of the expansion coefficients of the substrate or the anti-dust glass is $\alpha 3$, the expansion coefficient of the holder frame is $\alpha 1$, the gap previously set between the accommodating surface of the holder frame 8 and the substrate has a dimension of X and the accommodating surface of the holder frame 8 is a one-side length of L, then the number is preferably given as the number greater than the value which is calculated by $\{T(\alpha 1-\alpha 3)L\}/X$ and then is changed to an integer value. If doing so, by forming cutouts in this number in the holder frame, it is possible to reduce the difference between the smaller contraction ratio of the anti-dust glass and the substrate and the contraction ratio of the holder frame. This can prevent the compression of the substrate due to the contraction of the holder frame.

Furthermore, in the foregoing embodiment, the number of cutouts to be formed in each side of the holder frame 8 is: provided that the exterior air of the holder frame 8 has a temperature change T, the holder frame 8 has an expansion coefficient $\alpha 1$, the substrate 441A, 441E has an expansion coefficient $\alpha 2$, the gap previously set between the accommodating surface of the holder frame 8 and the substrate 441A, 441E is a dimension X and the accommodating surface of the holder frame 8 has one side length L, then the number is given as the number greater than the value which is calculated by $\{T(\alpha 1-\alpha 2)L\}/X$ and then is changed to an integer value. However, this is not limitative. For example, the total number of cutouts to be formed in the holder frame may be given the number as the value resulting when the expansion coefficient of the holder frame is divided by the expansion coefficient of the substrate and then is rounded up at the decimal part into an integer. By doing so, the difference can be reduced between the expansion coefficient of the holder frame and the expansion coefficient of the substrate.

Furthermore, instead of determining the number of cutouts by the above calculation way, the number of cutouts may be determined by taking account of the strength of the holder frame 8 and the like.

Meanwhile, in the foregoing embodiment, although the cutouts 87A–87L and the cutouts 88A–88H were formed in each side of the holder frame 8, there may be a side where cutouts are not formed.

Meanwhile, although, in the foregoing embodiment, there were alternately arranged, in each side, the cutouts 88A–88H formed in the accommodating surface and the cutouts 87A–87L formed in the luminous-flux incident surface, this is not limitative, i.e. may not be alternate arrangement. In doing so, because a cutout can be suitably formed, cutouts are made easy to form.

Furthermore, in the foregoing embodiment, although the expansion coefficient of the fixing plate 446 was given a value at or around the intermediate value in expansion coefficient between the cross dichroic prism 444 and the holder frame 8, referred later, this value is not limitative. Meanwhile, the expansion coefficient of the fixing plate 446 may be out of the range of $7.0 \times 10^{-6}$ or greater and $26 \times 10^{-6}$ or smaller.

Furthermore, the number of cutouts 446A3, 446A4 was given the value resulting when the expansion coefficient of the fixing plate 446 is divided by the expansion coefficient of the cross dichroic prism 444, and then is changed into an integer, this is not limitative. For example, the number of cutouts may be determined by taking account of the strength of the fixing plate 446.

Meanwhile, the number of cutouts to be formed in the fixing plate 446 may be the value resulting when the expansion coefficient of the holder frame 8 is divided by the expansion coefficient of the fixing plate 446, and then is rounded up in decimal part into an integer. In doing so, the difference in expansion/contraction ratio can be reduced between the holder frame 8 and the fixing plate 446. This can prevent the holder frame 8 from being acted upon by a force resulting from expansion/contraction of the fixing plate 446.

Meanwhile, in the foregoing embodiment, although the cutout 446A3 and cutout 446A4 of the fixing plate 446 were alternately arranged on each side, this is not limitative, i.e. may not be alternative arrangement. This facilitates to form cutouts.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A fixing plate attached at a luminous-flux exit side of a light modulator device that modulates a luminous flux emitted from a light source in accordance with image information and forming an optical image, and that fixes the light modulator device on a color-synthesizing optical device that synthesizes colors of light exited from the light modulator device, the fixing plate comprising:

a plate part in a rectangular plate form fixing the light modulator device and formed with an opening that transmits a luminous flux exited from the light modulator device, a cutout in a groove form being formed extending nearly orthogonal to a lengthwise of each side, in four sides of a luminous-flux incident surface or luminous-flux exit surface of the plate part.

2. The fixing plate according to claim 1, the cutout having a first cutout part extending from the opening toward an outer edge and a second cutout part extending from the outer edge toward the opening, the first cutout part and the second cutout part being alternately formed in each side.

3. An optical device having a light modulator device that modulates a luminous flux emitted from a light source in accordance with image information and forming an optical image, and a color-synthesizing optical device that synthesizes colors of light modulated by the light modulator device, the optical device comprising:

a fixing plate that fixes the light modulator device at a luminous-flux incident end face of a color-synthesizing optical device, the fixing plate being a fixing plate according to claim 1.

4. A projector comprising the optical device according to claim 3, and a projection optical system that projects an image formed by the optical device.

5. A fixing plate attached at a luminous-flux exit side of a light modulator device that modulates a luminous flux emitted from a light source in accordance with image information and forming an optical image, and that fixes the light modulator device on a color-synthesizing optical device that synthesizes colors of light exited from the light modulator device, the fixing plate comprising:

a plate part in a rectangular plate form fixing the light modulator device and formed with an opening that transmits a luminous flux exited from the light modulator device, a cutout in a groove form being formed extending nearly orthogonal to a lengthwise of each side, in four sides of a luminous-flux incident surface or luminous-flux exit surface of the plate part, a number of the cutouts being the value resulting when an expansion coefficient of the fixing plate is divided by an expansion coefficient of the color-synthesizing optical device and then is changed into an integer, or the above value changed into an integer is multiplied by an integer.

6. The fixing plate according to claim 5, the expansion coefficient is $7.0 \times 10^{-6}$ or greater and $26 \times 10^{-6}$ or smaller.

7. A fixing plate according to claim 6, the light modulator device having a light modulator element that modulates an incident luminous flux and a holder frame holding the light modulator element and fixed on the fixing plate, the expansion coefficient being a value nearly intermediate between the expansion coefficient of the color-synthesizing optical device and an expansion coefficient of the holder frame of the light modulator device.

* * * * *